United States Patent
Kuo et al.

(10) Patent No.: US 12,010,544 B2
(45) Date of Patent: Jun. 11, 2024

(54) PACKET-DEPENDENT LOGICAL CHANNEL RESTRICTION

(71) Applicant: Nokia Technologies Oy, Espoo (FI)

(72) Inventors: Ping-Heng Kuo, London (GB); Guillermo Pocovi, Aalborg (DK); Thomas Jacobsen, Nørresundby (DK)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/639,533

(22) PCT Filed: Sep. 29, 2020

(86) PCT No.: PCT/FI2020/050637
§ 371 (c)(1),
(2) Date: Mar. 1, 2022

(87) PCT Pub. No.: WO2021/064287
PCT Pub. Date: Apr. 8, 2021

(65) Prior Publication Data
US 2022/0377596 A1    Nov. 24, 2022

Related U.S. Application Data

(60) Provisional application No. 62/910,132, filed on Oct. 3, 2019.

(51) Int. Cl.
*H04W 28/02* (2009.01)
*H04L 5/00* (2006.01)

(52) U.S. Cl.
CPC ....... *H04W 28/0263* (2013.01); *H04L 5/0044* (2013.01)

(58) Field of Classification Search
None
See application file for complete search history.

(56) References Cited

U.S. PATENT DOCUMENTS

| 7,043,541 B1 * | 5/2006 | Bechtolsheim ..... H04L 41/0806 709/236 |
| 2005/0201477 A1 * | 9/2005 | Cho ...................... H04W 16/12 375/260 |

(Continued)

FOREIGN PATENT DOCUMENTS

| CN | 101925116 A  * | 12/2010 | .......... H04W 28/065 |
| WO | 2018/075828 A1 | 4/2018 | |

(Continued)

OTHER PUBLICATIONS

"3rd Generation Partnership Project; Technical Specification Group Services and System Aspects; Service requirements for cyber-physical control applications in vertical domains; Stage 1 (Release 17)", 3GPP TS 22.104, V17.0.0, Jun. 2019, pp. 1-54.
"Survival time triggered PDCP duplication", 3GPP TSG-RAN WG2 Meeting #105bis, R2-1903142, Agenda: 11.7.4, CATT, Apr. 8-12, 2019, pp. 1-3.

(Continued)

*Primary Examiner* — Andrew C Oh
(74) *Attorney, Agent, or Firm* — Lippes Mathias LLP

(57) ABSTRACT

Techniques of ensuring that the survival time requirement is fulfilled include applying, by the UE (transmitter), a plurality of different logical channel (LCH) mapping restrictions to the packets on the same data radio bearer (DRB). In some implementations, the LCH mapping restrictions to be applied depend on the SN of the PDCP PDU to be processed. For example, the first LCH mapping restriction may be limited to radio resource with lower reliability (e.g., with the first LCH mapping restriction, the data from this LCH can only be mapped to a CG configuration without repetition and/or high MCS), while the second LCH mapping restriction may be limited to radio resources with extremely high reliability (e.g., with the first LCH mapping restriction, the data from this LCH can only be mapped to a CG configuration with repetitions and/or low MCS).

18 Claims, 16 Drawing Sheets

(56) References Cited

U.S. PATENT DOCUMENTS

| | | | |
|---|---|---|---|
| 2007/0202816 A1* | 8/2007 | Zheng | H04L 5/0037 |
| | | | 455/91 |
| 2010/0110874 A1* | 5/2010 | Kang | H04L 27/2602 |
| | | | 370/344 |
| 2011/0076985 A1* | 3/2011 | Chami | H04L 45/306 |
| | | | 455/445 |
| 2013/0100914 A1* | 4/2013 | Nakamura | H04B 7/068 |
| | | | 375/232 |
| 2018/0270698 A1 | 9/2018 | Babaei et al. | |
| 2018/0309660 A1 | 10/2018 | Loehr et al. | |
| 2018/0324641 A1 | 11/2018 | Tsai et al. | |
| 2018/0368160 A1* | 12/2018 | Kunt | H04W 72/23 |
| 2019/0007984 A1* | 1/2019 | Kuroda | H04W 88/16 |
| 2019/0075589 A1 | 3/2019 | Jeon et al. | |
| 2019/0104560 A1* | 4/2019 | Nuggehalli | H04L 69/14 |
| 2019/0174562 A1* | 6/2019 | Lu | H04L 1/0061 |
| 2019/0215717 A1 | 7/2019 | Lee et al. | |
| 2020/0037191 A1* | 1/2020 | Jang | H04L 1/0026 |
| 2021/0329623 A1* | 10/2021 | Yoshioka | H04L 1/0003 |

FOREIGN PATENT DOCUMENTS

| | | | | |
|---|---|---|---|---|
| WO | WO-2018075828 A1 * | 4/2018 | ............ | H04W 72/02 |
| WO | 2021/028032 A1 | 2/2021 | | |

OTHER PUBLICATIONS

"Details of Selective Duplication Procedure", 3GPP TSG-RAN WG2 Meeting #105bis, R2-1904135, Agenda: 11.7.4, Lenovo, Apr. 8-12, 2019, pp. 1-4.

"LCP restrictions with multiple CG configurations", 3GPP TSG-RAN WG2 Meeting #106, R2-1907196, Agenda: 11.7.2.2, Nokia, May 13-17, 2019, 2 pages.

International Search Report and Written Opinion received for corresponding Patent Cooperation Treaty Application No. PCT/FI2020/050637, dated Dec. 18, 2020, 17 pages.

"Stage-2 running CR for support of NR Industrial IoT Wi", 3GPP TSG-RAN WG2 Meeting #107, R2-1911545, Nokia, Aug. 26-30, 2019, 11 pages.

European Search Report for Application No. 20873118.2, dated Sep. 22, 2023, 9 pages.

* cited by examiner

US 12,010,544 B2

PACKET-DEPENDENT LOGICAL CHANNEL RESTRICTION

RELATED APPLICATION

This application was originally filed as PCT Application No. PCT/FI2020/050637, filed on Sep. 29, 2020, which claims priority from U.S. Application No. 62/910,132, filed on Oct. 3, 2019, each of which is incorporated herein by reference in its entirety.

TECHNICAL FIELD

This description relates to communications.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3rd Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's LTE upgrade path for mobile networks. In LTE, base stations or access points (APs), which are referred to as enhanced Node AP (eNBs), provide wireless access within a coverage area or cell. In LTE, mobile devices, or mobile stations are referred to as user equipment (UE). LTE has included a number of improvements or developments.

A global bandwidth shortage facing wireless carriers has motivated the consideration of the underutilized millimeter wave (mmWave) frequency spectrum for future broadband cellular communication networks, for example. mmWave (or extremely high frequency) may, for example, include the frequency range between 30 and 300 gigahertz (GHz). Radio waves in this band may, for example, have wavelengths from ten to one millimeters, giving it the name millimeter band or millimeter wave. The amount of wireless data will likely significantly increase in the coming years. Various techniques have been used in attempt to address this challenge including obtaining more spectrum, having smaller cell sizes, and using improved technologies enabling more bits/s/Hz. One element that may be used to obtain more spectrum is to move to higher frequencies, e.g., above 6 GHz. For fifth generation wireless systems (5G), an access architecture for deployment of cellular radio equipment employing mmWave radio spectrum has been proposed. Other example spectrums may also be used, such as cmWave radio spectrum (e.g., 3-30 GHz).

SUMMARY

According to an example implementation, a method includes receiving, by a user equipment (UE), configuration message from a node of a network, the configuration message representing criteria relating to characteristics of uplink (UL) data packets; and generating, by the UE, a logical channel (LCH) mapping restriction controlling rule based on the criteria relating to characteristics, the LCH mapping restriction controlling rule identifying a first set of UL data packets to be sent to the network using a first logical channel (LCH) and a second set of UL data packets to be sent to the network using a second LCH, the first LCH being associated with a first LCH mapping restriction, the second LCH being associated with a second LCH mapping restriction.

According to an example implementation, an apparatus includes at least processor and at least one memory including computer program code, the at least one memory and the computer program code configured to, with the at least one processor, cause the apparatus at least to receive configuration message from a node of a network, the configuration message representing criteria relating to characteristics of uplink (UL) data packets; and generate a logical channel (LCH) mapping restriction controlling rule based on the criteria relating to characteristics, the LCH mapping restriction controlling rule identifying a first set of UL data packets to be sent to the network using a first logical channel (LCH) and a second set of UL data packets to be sent to the network using a second LCH, the first LCH being associated with a first LCH mapping restriction, the second LCH being associated with a second LCH mapping restriction.

According to an example implementation, an apparatus includes means for receiving configuration message from a node of a network, the configuration message representing criteria relating to characteristics of uplink (UL) data packets; and means for generating a logical channel (LCH) mapping restriction rule based on the criteria relating to characteristics, the LCH mapping restriction controlling rule identifying a first set of UL data packets to be sent to the network using a first logical channel (LCH) and a second set of UL data packets to be sent to the network using a second LCH, the first LCH being associated with a first LCH mapping restriction, the second LCH being associated with a second LCH mapping restriction.

According to an example implementation, a computer program product includes a computer-readable storage medium and storing executable code that, when executed by at least one data processing apparatus, is configured to cause the at least one data processing apparatus to receive configuration message from a node of a network, the configuration message representing criteria relating to characteristics of uplink (UL) data packets; and generate a logical channel (LCH) mapping restriction rule based on the criteria relating to characteristics, the LCH mapping restriction controlling rule identifying a first set of UL data packets to be sent to the network using a first logical channel (LCH) and a second set of UL data packets to be sent to the network using a second LCH, the first LCH being associated with a first LCH mapping restriction, the second LCH being associated with a second LCH mapping restriction.

According to an example implementation, a method includes receiving, by a user equipment (UE), configuration message from a node of a network, the configuration message representing criteria relating to characteristics of uplink (UL) data packets; generating, by the controlling circuitry, a mapping restriction rule based on the criteria relating to characteristics to determine a mapping restriction of a plurality of mapping restrictions used for an UL data packet; and performing, by the UE and in a media access control (MAC) layer configured to serve a radio link control, a switching operation to determine a LCH mapping restriction for the UL data packet.

According to an example implementation, an apparatus includes at least processor and at least one memory including computer program code, the at least one memory and the computer program code configured to, with the at least one processor, cause the apparatus at least to receive configuration message from a node of a network, the configuration message representing criteria relating to characteristics of uplink (UL) data packets; generate a LCH mapping restriction rule based on the criteria relating to characteristics to determine a mapping restriction of a plurality of mapping restrictions used for an UL data packet; and perform, in a media access control (MAC) layer configured to serve a radio link control, a switching operation to determine a LCH mapping restriction for the UL data packet.

According to an example implementation, an apparatus includes means for receiving configuration message from a node of a network, the configuration message representing criteria relating to characteristics of uplink (UL) data packets; means for generating a LCH mapping restriction rule based on the criteria relating to characteristics to determine a mapping restriction of a plurality of mapping restrictions used for an UL data packet; and performing, in a media access control (MAC) layer configured to serve a radio link control, a switching operation to determine a LCH mapping restriction for the UL data packet.

According to an example implementation, a computer program product includes a computer-readable storage medium and storing executable code that, when executed by at least one data processing apparatus, is configured to cause the at least one data processing apparatus to receive configuration message from a node of a network, the configuration message representing criteria relating to characteristics of uplink (UL) data packets; generate a LCH mapping restriction rule based on the criteria relating to characteristics to determine a mapping restriction of a plurality of mapping restrictions used for an UL data packet; and perform, in a media access control (MAC) layer configured to serve a radio link control, a switching operation to determine a LCH mapping restriction for the UL data packet.

According to an example implementation, a method includes receiving, by a user equipment (UE), configuration message from a node of a network, the configuration message representing values of a configured grant (CG) parameters and ultra-reliable transmission (TX) occasion parameters; and sending, by the UE, data to the network over a CG-based physical uplink shared channel (PUSCH) based on the values of the CG and ultra-reliable TX parameters.

According to an example implementation, an apparatus includes at least processor and at least one memory including computer program code, the at least one memory and the computer program code configured to, with the at least one processor, cause the apparatus at least to receive a configuration message from a node of a network, the configuration message representing values of a configured grant (CG) parameters and ultra-reliable transmission (TX) occasion parameters; and send data to the network over a CG-based physical uplink shared channel (PUSCH) based on the values of the CG and ultra-reliable TX parameters.

According to an example implementation, an apparatus includes means for receiving configuration message from a node of a network, the configuration message representing values of a configured grant (CG) parameters and ultra-reliable transmission (TX) occasion parameters; and means for sending data to the network over a CG-based physical uplink shared channel (PUSCH) based on the values of the CG and ultra-reliable TX parameters.

According to an example implementation, a computer program product includes a computer-readable storage medium and storing executable code that, when executed by at least one data processing apparatus, is configured to cause the at least one data processing apparatus to receive configuration message from a node of a network, the configuration message representing values of a configured grant (CG) parameters and ultra-reliable transmission (TX) occasion parameters; and send data to the network over a CG-based physical uplink shared channel (PUSCH) based on the values of the CG and ultra-reliable TX parameters.

According to an example implementation, a method includes receiving, by a node (gNB) of a network, time-sensitive communications (TSC) assistance information (TSCAI) indicating a survival time requirement of at least one traffic flow in the network; generating, by the gNB, configuration message representing criteria relating to characteristics of uplink (UL) data packets to be sent by a user equipment (UE); and sending, by the gNB, the configuration message to the UE.

According to an example implementation, an apparatus includes at least processor and at least one memory including computer program code, the at least one memory and the computer program code configured to, with the at least one processor, cause the apparatus at least to receive time-sensitive communications (TSC) assistance information (TSCAI) indicating a survival time requirement in the network; generate configuration message representing criteria relating to characteristics of uplink (UL) data packets to be sent by a user equipment (UE); and send the configuration message to the UE.

According to an example implementation, an apparatus includes means for receiving time-sensitive communications (TSC) assistance information (TSCAI) indicating a survival time requirement in the network; means for generating configuration message representing criteria relating to characteristics of uplink (UL) data packets to be sent by a user equipment (UE); and sending the configuration message to the UE.

According to an example implementation, a computer program product includes a computer-readable storage medium and storing executable code that, when executed by at least one data processing apparatus, is configured to cause the at least one data processing apparatus to receive time-sensitive communications (TSC) assistance information (TSCAI) indicating a survival time requirement in the network; generate configuration message representing criteria relating to characteristics of uplink (UL) data packets to be sent by a user equipment (UE); and send the configuration message to the UE.

The details of one or more examples of implementations are set forth in the accompanying drawings and the description below. Other features will be apparent from the description and drawings, and from the claims.

DETAILED DESCRIPTION

Figure 1:
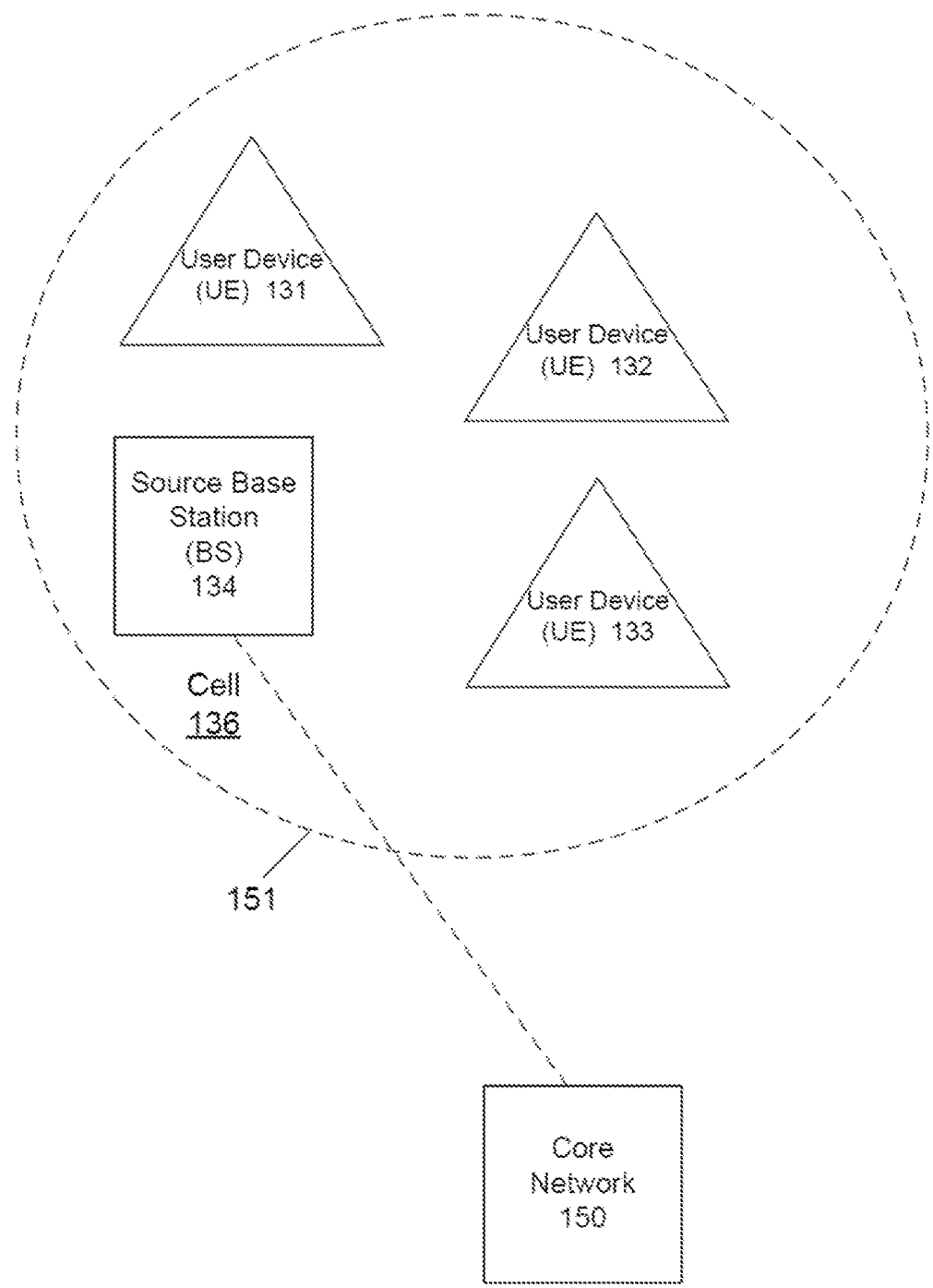
FIG. 1 is a block diagram of a digital communications network according to an example implementation.

FIG. 1 is a block diagram of a digital communications system such as a wireless network 130 according to an example implementation. In the wireless network 130 of FIG. 1, user devices 131, 132, 133 and 135, which may also be referred to as mobile stations (MSs) or user equipment (UEs), may be connected (and in communication) with a base station (BS) 134, which may also be referred to as an access point (AP), an enhanced Node B (eNB), a gNB (which may be a 5G base station) or a network node. At least part of the functionalities of an access point (AP), base station (BS) or (e)Node B (eNB) may be also be carried out by any node, server or host which may be operably coupled to a transceiver, such as a remote radio head. BS (or AP) 134 provides wireless coverage within a cell 136, including to user devices 131, 132, 133 and 135. Although only four user devices are shown as being connected or attached to BS 134, any number of user devices may be provided. BS 134 is also connected to a core network 150 via an interface 151. This is merely one simple example of a wireless network, and others may be used.

A user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks.

The various example implementations may be applied to a wide variety of wireless technologies, wireless networks, such as LTE, LTE-A, 5G (New Radio, or NR), cmWave, and/or mmWave band networks, or any other wireless network or use case. LTE, 5G, cmWave and mmWave band networks are provided only as illustrative examples, and the various example implementations may be applied to any wireless technology/wireless network. The various example implementations may also be applied to a variety of different applications, services or use cases, such as, for example, ultra-reliability low latency communications (URLLC), Internet of Things (IoT), time-sensitive communications (TSC), enhanced mobile broadband (eMBB), massive machine type communications (MMTC), vehicle-to-vehicle (V2V), vehicle-to-device, etc. Each of these use cases, or types of UEs, may have its own set of requirements.

Some 5G technologies can be leveraged to facilitate industrial operations such as factory automation, wherein time-sensitive communications (TSC) may be needed for data to be exchanged across different devices such as machinery and robots. Accordingly, how 5G can be tailored and enhanced to support TSC is a key topic that 3GPP is addressing with the target to realize industrial applications.

Compared to conventional cellular communications, TSC has some distinctive requirements and characteristics. For example, traffic arrival of TSC is typically periodic with fixed burst size, which allows the scheduler to determine resource allocation in advance if such information is known. In Rel-16 of 3GPP, it is specified that a gNB is able to get certain information relating to the traffic flows based on TSC Assistance Information (TSCAI) from the core network. In this way, the gNB can assign configured scheduling resources (e.g., SPS and CG) with appropriate parameters such as periodicity and transport block size to cater for TSC flows.

Many industrial applications, and TSC use cases, have a survival time requirement, which means a time interval that the application can still operate without reception of a packet. More formally, survival time is defined as a time that an application consuming a communication service may continue without an anticipated message. The survival time indicates to the communication service the time available to recover from failure. The survival time can be expressed as a time period or, with cyclic traffic, as a maximum number of consecutive incorrectly received or lost messages.

Figure 2:
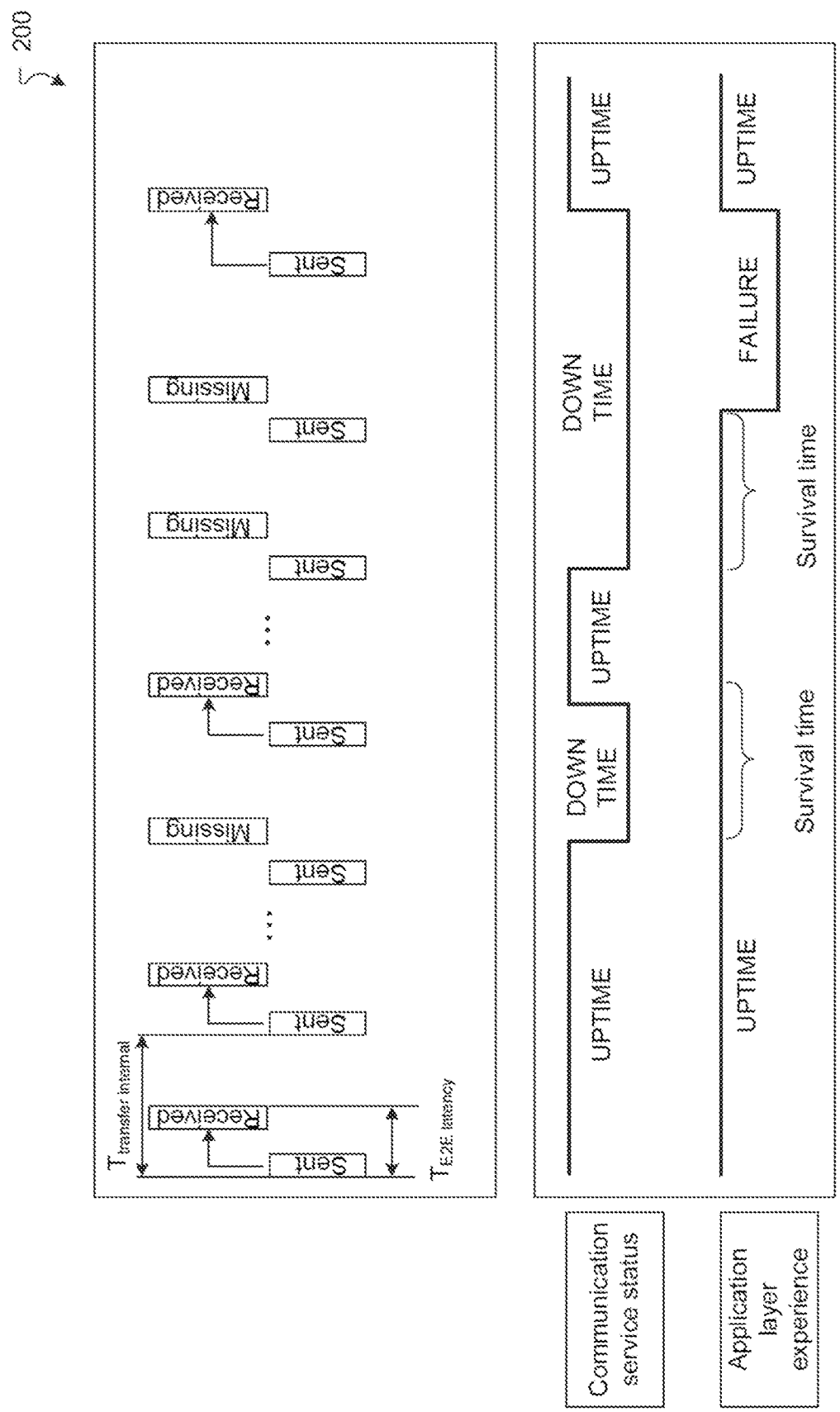
FIG. 2 is a diagram illustrating a survival time requirement in TSC according to an example implementation.

FIG. 2 is a diagram illustrating a survival time requirement 200 in TSC. Survival time indicates to a communication service the time available to recover from failure. The survival time can be expressed as a time period or, especially with cyclic traffic, as maximum number of consecutive incorrectly received or lost messages. FIG. 2 shows an example scenario in which survival time is violated and accordingly results in application failure when N consecutive packets (N=2 in the example of FIG. 2) are not delivered successfully.

Conventional approaches to ensuring that the survival time requirement is fulfilled include transmitting the packets of this traffic flow in a reliable manner (e.g., based on PDCP repetition based on transmission-time interval bundling). Further, in Rel-16, multiple active configured grant/semi-persistent scheduling (CG/SPS) per bandwidth portion (BWP) can be supported, which allows a UE to concurrently handle multiple service types with different traffic characteristics and QoS requirements. Moreover, one could instruct the UE to perform PDCP duplication upon hybrid automatic repeat request (HARQ) feedback or any other dynamic indication to avoid consecutive packet errors.

The above-described conventional approaches require a large amount of additional radio resources (for e.g., transmission of packet replica, or parity bits), which result in inefficient resource usage. Additionally, the additional radio resources also create interference that affect the overall system performance Note that PDCP duplication requires a packet and its copies to be sent on at least two and perhaps four paths, which requires additional radio resources to transmit the duplicates. Moreover, per-packet selective duplication (e.g., based on HARQ feedback) may create dynamic and unpredictable interference across cells.

In contrast to the above-described conventional approaches to ensuring survival time requirements in TSC, improved techniques include applying, by the UE (transmitter), two different logical channel (LCH) mapping restrictions to the packets on the same data radio bearer (DRB). In some implementations, a selected LCH mapping restriction depends on the SN of the PDCP PDU to be processed. For example, a mapping restriction controlling rule determines that the first LCH mapping restriction may be limited to radio resource with lower reliability (e.g., with the first LCH mapping restriction, the data from this LCH can only be mapped to a CG configuration without repetition and/or high MCS), while the second LCH mapping restriction may be limited to radio resources with extremely high reliability (e.g., with the first LCH mapping restriction, the data from this LCH can only be mapped to a CG configuration with repetitions and/or low MCS).

An aspect of above-described improved techniques is a LCH mapping restriction controlling rule in which a transmitter cyclically transmits at least one packet in a very reliable manner to ensure at least one packet is transmitted successfully during the survival time interval. Accordingly, instead of transmitting every packet based on a common reliability level, the transmitter occasionally (based on a cyclic pattern according to the required survival time) transmits a specific packet with additional radio resources to increase its successful-decoding probability. In the context of NR, each packet can be a PDCP PDU with a sequence number (SN). In some implementations, a packet can be an UL data packet. In some implementations, a packet can be a downlink (DL) data packet.

Advantageously, the above-described improved techniques satisfy the survival time requirements in TSC while minimizing the amount of additional radio resources required or interference occurring.

To summarize, the improved techniques described above include the following:

A UE which can dynamically change a reliability requirement of packets from the same DRB, according to a rule based on the sequence number (or other characteristics) of the packet. The reliability requirement can be represented in a LCH mapping restriction.

A gNB which can determine the rule (e.g., parameter values defining the rule) based on the knowledge of survival time requirement of at least one traffic flows.

A signaling from the gNB, which provides the rule (i.e., parameter values) that allow the UE to identify the sequence numbers of packets that should be transmitted with higher reliability.

A dynamic signaling from the gNB, which instructs the UE to modify the rule, e.g., behavior of determining transmission reliability based on sequence numbers of packets, including de-activation and activation of such reliability switching behavior.

Figure 3A:
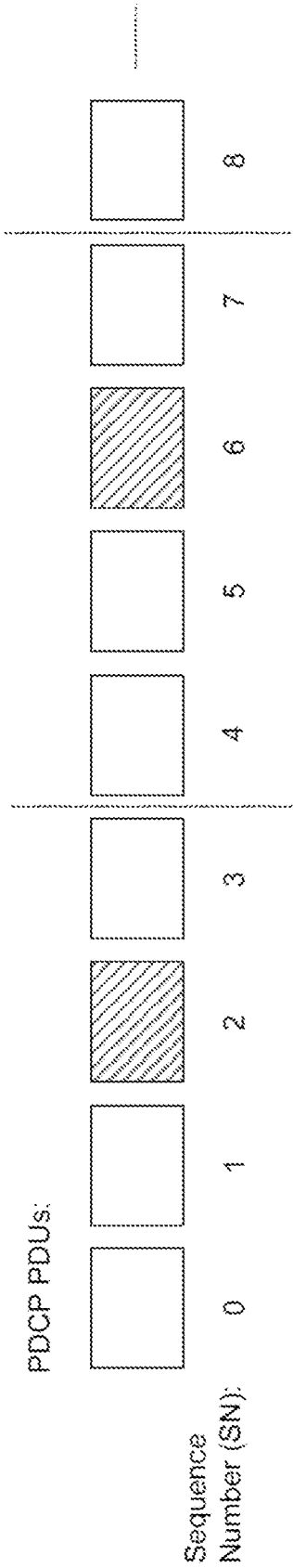
FIG. 3A is a diagram illustrating criteria relating to characteristics of packets for applying an LCH mapping restriction according to an example implementation.

FIG. 3A is a diagram illustrating an example criteria relating to characteristics 300 for applying an LCH mapping restriction controlling rule in an example UL scenario. As shown in FIG. 3, a UE (transmitter) may apply, as a LCH mapping restriction rule, a determination between two different LCH mapping restrictions to the packets on the same DRB, depending on the SN of the PDCP PDU to be processed. The first LCH mapping restriction may be limited to radio resource with lower reliability (e.g., with the first LCH mapping restriction, the data from this LCH can only be mapped to a CG configuration without repetition and/or high MCS), while the second LCH mapping restriction may be limited to radio resources with extremely high reliability (e.g., with the first LCH mapping restriction, the data from this LCH can only be mapped to a CG configuration with repetitions and/or low MCS).

In order for the UE to identify the SN of packets that should be transmitted with higher reliability (i.e., the second LCH mapping restriction), the gNB may pre-configure some parameters so that the UE can derive the cyclic pattern. In the example shown in FIG. 3A, the gNB provides parameters K and X, which represent a mapping restriction rule for the UE to transmit the (X+1)-th PDCP PDU in every K PDCP PDUs in a more reliable fashion. Note that it is assumed the gNB has the knowledge of survival time requirement and burst arrival periodicity of the traffic flow, based on TSCAI, so the gNB can determine these parameters accordingly.

Whenever a newly arrived packet has a SN satisfying the criterion based on the parameters K and X, the PDCP layer may send a cross-layer indication to MAC layer and instructs the MAC layer to change the corresponding LCH mapping restriction setting. The LCH should stay in this tentative mapping restriction setting until at least one of the followings occur:

The packet with its SN satisfies the criterion based on parameters K and X is processed (e.g., sent over the air), and/or A pre-configured timer is expired (the timer interval could be determined by, e.g., the required survival time).

Then, the LCH may switch back to the default LCH mapping restriction setting.

In the special cases where two consecutive packet delivery failure is not allowed (as shown in FIG. 2), K can be set as 2 and X can be set as 1 (or 0), so basically all odd-indexed (or even-indexed) packets should be transmitted with higher reliability.

In some implementations, a UE configures multiple RLC entities under a DRB, where the LCHs corresponding to these RLC entities are configured with different LCH mapping restrictions targeting at different reliability levels. Then, based on the parameters K and X, the PDCP should switch the RLC entity where the PDCP PDU should be submitted to according to a LCH mapping restriction rule. That is, for certain packets, the PDCP would submit those packets to the RLC entity whose LCH is configured with LCH mapping restriction for higher reliability target, in order to avoid survival time violation. Accordingly, in this implementation, there is no need for cross-layer indication between PDCP and MAC layers.

Furthermore, although the parameters are pre-configured, they could be dynamically altered, or the behavior of SN-dependent reliability switching could be de-activated and activated from time to time. That is, dynamic signaling such as MAC control element (MAC-CE) or downlink control information (DCI) could be introduced to modify such UE behavior.

Apart from the SN, the improved techniques described above could be extended to the type of packet as well. In some implementations, the reliability target changes based on the QFI of the packet, or whether the packet is a control PDU or data PDU.

Additionally, in some implementations, a type of configured scheduling resource (including CG and DL SPS) is used, wherein the CG/SPS configuration has a cyclic high-reliability transmission occasion that becomes available periodically. In this way, the packets can be transmitted very reliably at least once during a period to protect survival time. With this approach, a LCH mapping restriction change is not necessary and may simplify operations from a perspective of the UE.

Figure 3B:
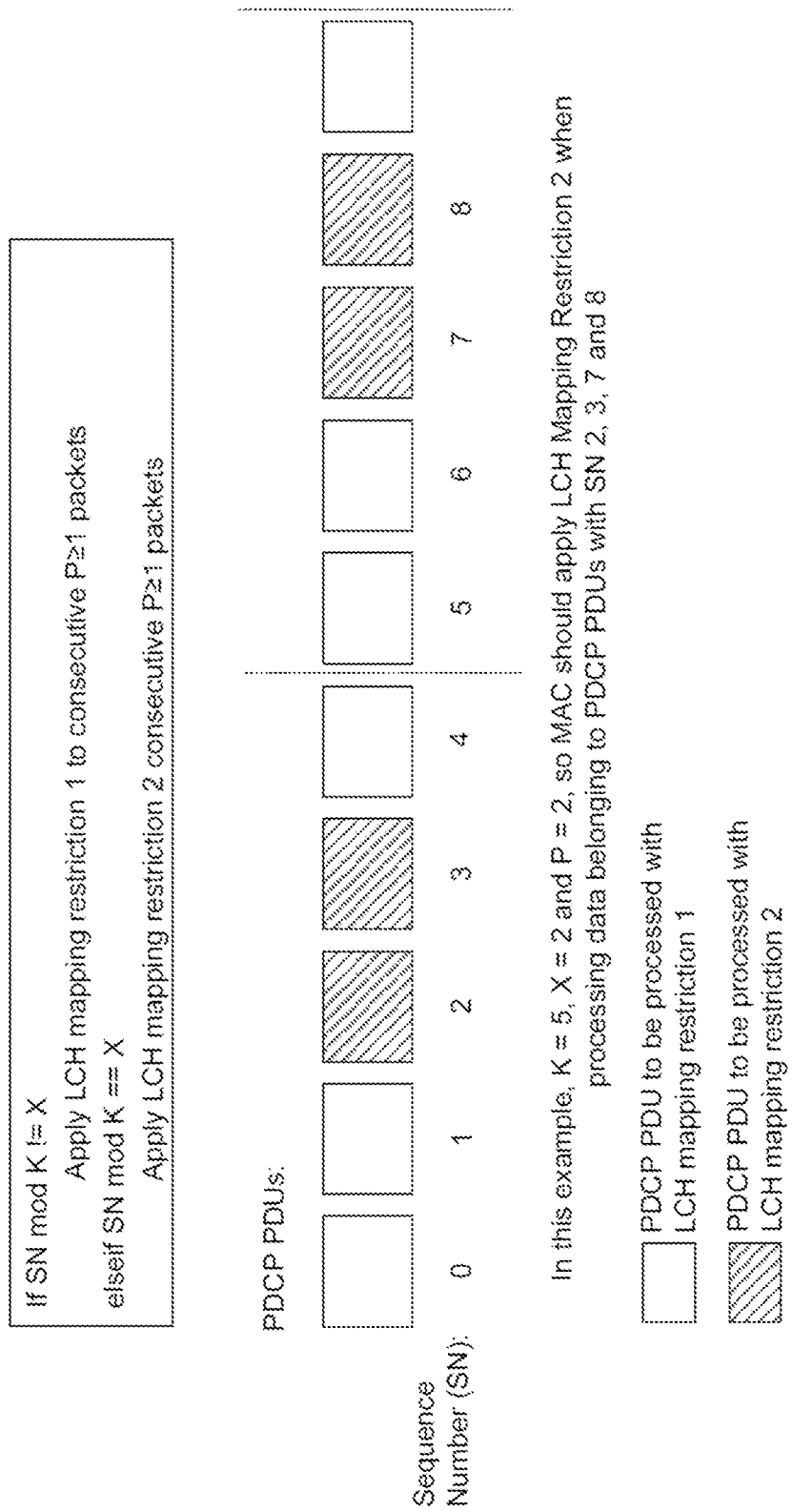
FIG. 3B is a diagram illustrating criteria relating to characteristics of packets for applying an LCH mapping restriction according to another example implementation.

FIG. 3B is a diagram illustrating an example criteria relating to characteristics 350 for applying an LCH mapping restriction controlling rule in another example UL scenario. In this case, when a packet SN meets the criterion specified and to be treated with higher reliability, the next P consecutive packets will also be treated with higher reliability (or is subject to the alternative LCH mapping restriction) as well, where the value of P is determined and configured by the gNB along with K and X. These extensions are for cases in which an application layer message with survival time requirement is partitioned into multiple packets (e.g., PDCP PDUs) in the RAN domain. In this way, assuming the application message is segmented into P packets, all of the P packets pertaining to this application message could be transmitted with LCH mapping restriction of higher reliability to ensure the whole message is delivered successfully.

Figure 4:
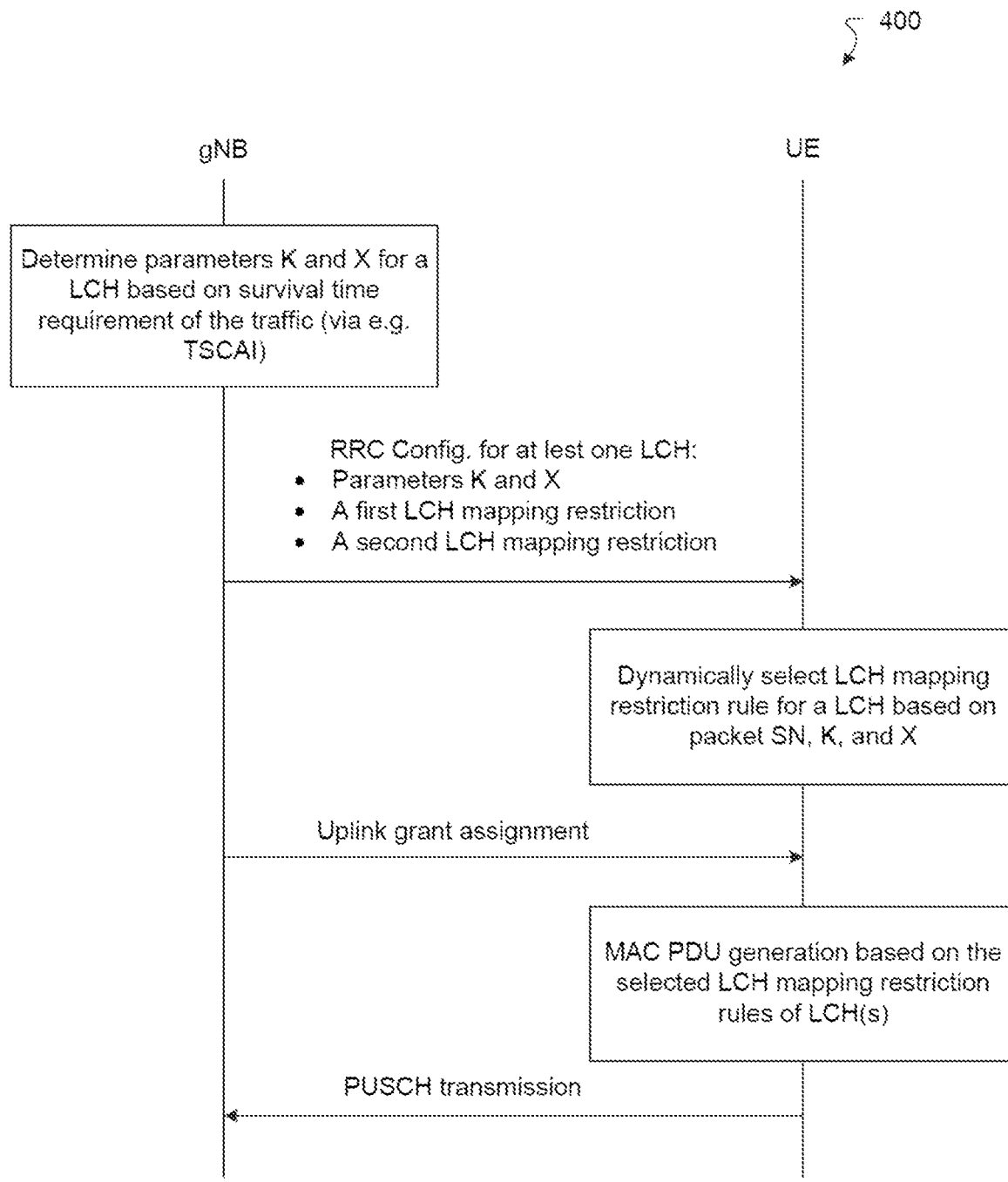
FIG. 4 is a sequence diagram illustrating messaging between a gNB and a UE according to an example implementation.

FIG. 4 is a sequence diagram illustrating an example messaging 400 between a gNB and a UE. Initially, the gNB obtains information relating to the characteristics of certain traffic flow (e.g., based on TSCAI), such as the traffic periodicity (transfer interval) and survival time requirement. Based on the information, the gNB is able to evaluate the number of consecutive packet delivery failure that lead to survival time violation, and hence determine the parameters K and X. These may be communicated to the UE via RRC signalling.

To implement the messaging 400 shown in FIG. 4, the gNB further determines and signals LCH mapping restriction controlling rule with two LCH mapping restrictions that can be applied to the LCH corresponding to the traffic flow on a radio bearer: the first one can be configured as the default setting (e.g., the data of this packet from this LCH can only be mapped to CG A), whereas the second one is applied to a particular set of packets (e.g., the data of this packet from this LCH can only be mapped to CG B). The UE selects, according to the signaled rule, one of the two LCH mapping restrictions based on the SN of the packet and the values of the parameters K and X to be processed.

Note that LCH mapping restrictions are, in some implementations, associated with different types of uplink resource parameters. Examples of the different types of uplink resource parameters include (but are not limited to) the following:

the index of CG configuration,
the type of uplink resources (DG, Type-1 CG, or Type-2 CG),
the index of serving cells,
the PUSCH duration,
the subcarrier spacing (SCS),
parameters of the grant, such as MCS-C-RNTI, MCS/TBS, TX power, HARQ settings, an indication relating to grant priority, reliability target, or allowed LCHs, etc.

The parameters K and X, along with the LCH mapping restriction rules, are configured for at least one of the uplink LCHs of the UE. Then, the UE may determine which of the configured LCH mapping restriction should be applied, by checking the SN of the packet along with the configured parameters.

Figure 5:
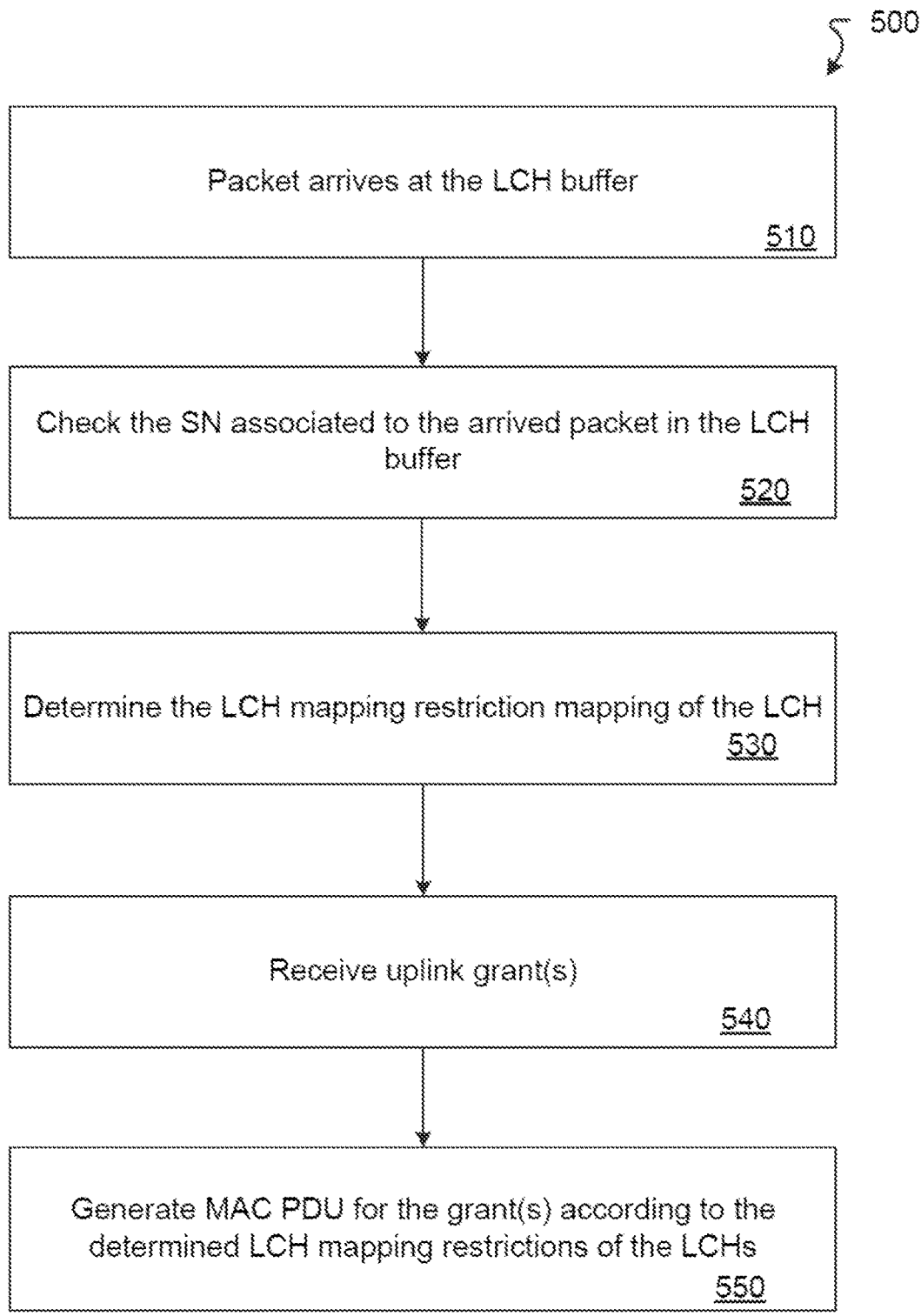
FIG. 5 is a flow chart illustrating a process of applying a LCH mapping restriction controlling rule according to an example implementation.

FIG. 5 is a flow chart illustrating an example process 500 of applying a LCH mapping restriction controlling rule. The process 500 shown in FIG. 5 has the LCH mapping restriction determination according to a LCH mapping restriction controlling rule is conducted by the MAC layer based on the SN of the PDCP PDU corresponding to the data in the LCH buffer that is to be processed. In the process 500, it is assumed that the MAC is able to acquire the information relating to the packet SN of data arrived in the buffer from the higher layer.

At 510, a packet including data arrives at a LCH buffer. At 520, as the data arrives at the LCH buffer, the MAC checks the SN of the packet including the arrived data. At 530, based on the parameter values provided by the gNB, the MAC determines which LCH mapping restriction it should apply, according to the LCH mapping restriction rule, in order to conduct resource mapping properly. It is presumed that the LCH is pre-configured with at least two LCH mapping restriction, so the UE is able to switch based on the SN of packet to be processed. At 540, the UE receives an uplink grant or grants from a node of the network, perhaps including the gNB. At 550, the MAC generates MAC PDUs for the grant(s) according to the determined LCH mapping restrictions for the LCH.

In one exemplary embodiment, the two LCH mapping restriction may correspond to two CG configurations. For example:

The first LCH mapping restriction: The data from this LCH are mapped to resources of CG configuration 1.
The second LCH mapping restriction: The data from this LCH are mapped to resources of CG configuration 2.

Accordingly, the UE may hop between resources of two different CG configurations to transmit the packet of a traffic flow.

Figure 6:
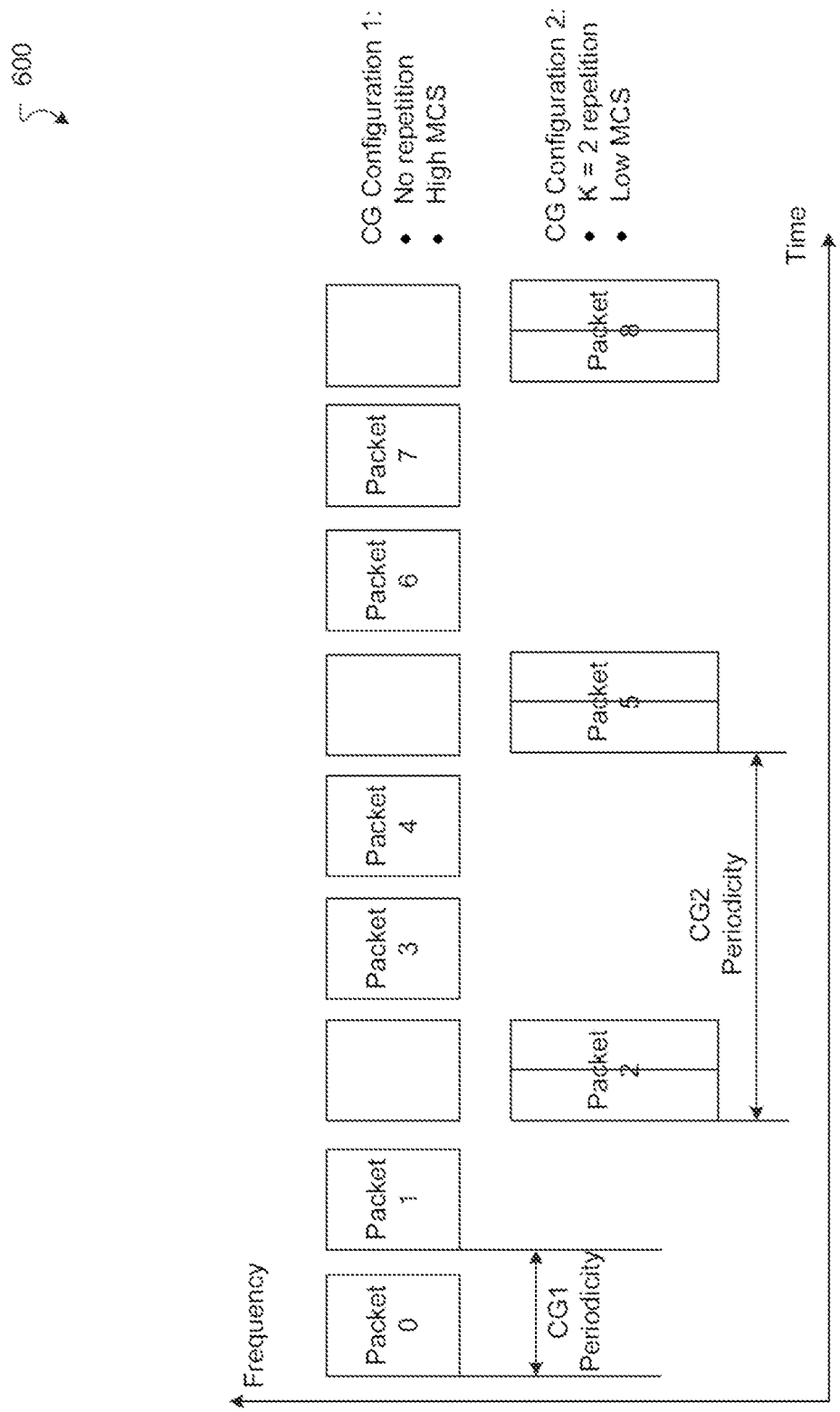
FIG. 6 is a diagram illustrating a scheduling of UL data packets with either a first or second CG configuration according to an example implementation.

FIG. 6 is a diagram illustrating an example scheduling 600 of UL data packets with either a first or second CG configuration. As shown FIG. 6, the UE is configured with both CG configuration 1 (CG1) and CG configuration 2 (CG2), where CG1 uses less radio resource and provides lower reliability, while CG2 requires more radio resource but it also allows more reliable transmission (e.g., with more repetitions and lower MCS). For a particular traffic flow, the UE is instructed (via LCH mapping restriction) by the gNB to use CG2 for every third packet from this flow, while all other packets should be limited to CG1. This implies that the application cannot tolerate N=3 consecutive packet delivery failure in order to keep the application running.

Figure 7:
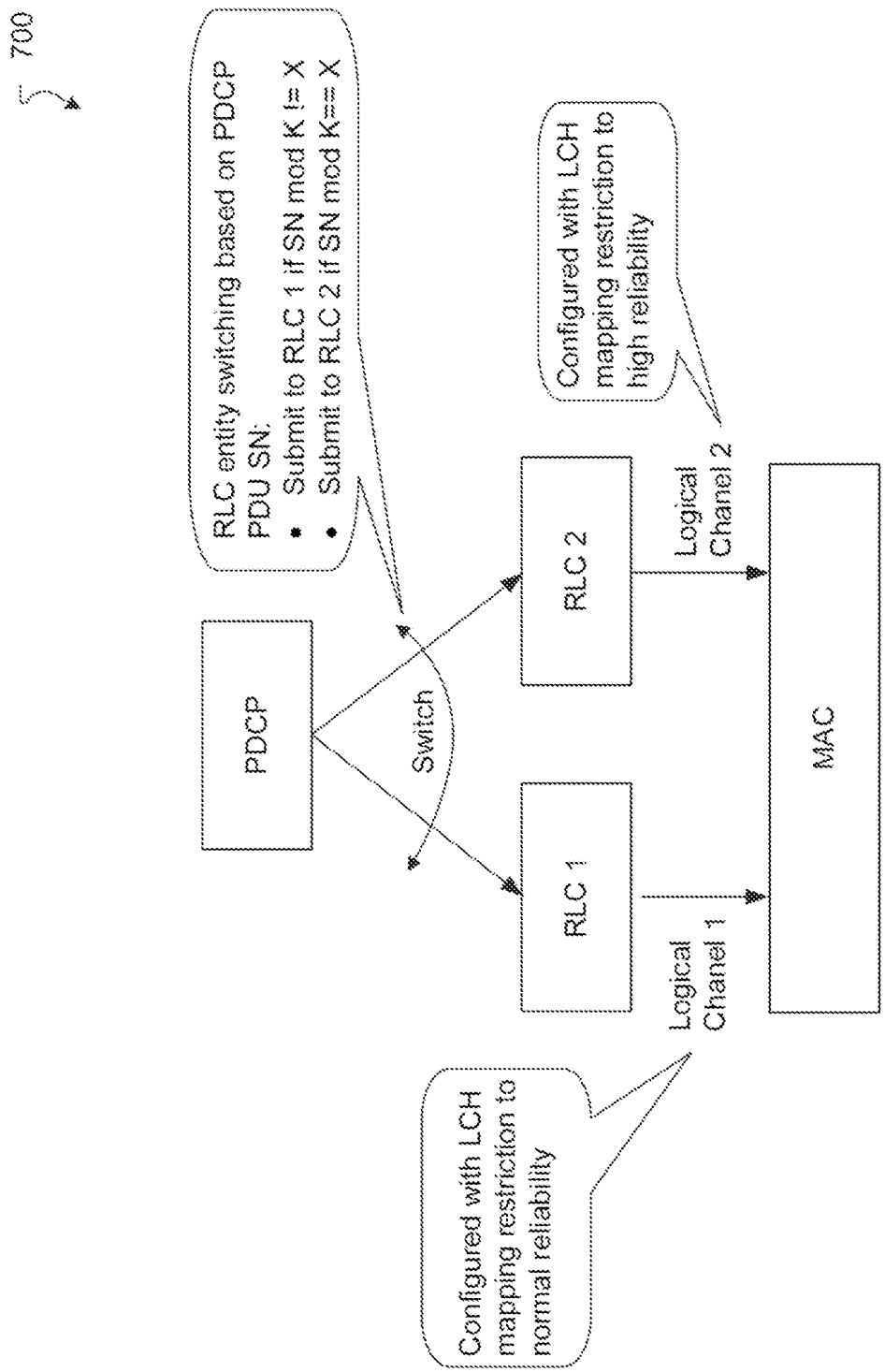
FIG. 7 is a diagram illustrating a switch between RLC entities at the PDCP layer according to an example implementation.

FIG. 7 is a diagram illustrating a switch 700 between RLC entities at the PDCP layer. To avoid cross-layer interaction which potentially increases implementation complexity, the LCH mapping restriction controlling rule described are, in some implementations, realized by a RLC entity switching.

In this implementation, multiple RLC entities are configured for a DRB and the respective LCH associated with each RLC entity is configured with its own reliability target different from other reliability targets with which other LCHs of other RLCs. Based on the SN of the packet, the PDCP layer may determine which RLC entity the PDCP PDU should be submitted to, in order to transmit it with higher reliability. Since the decision is solely made by the PDCP layer, there is no need for cross-layer interaction.

To review, the examples provided in FIGS. 5 and 7 (i.e., the determination of a LCH mapping restriction for a packet being determined in the MAC or PDCP layer) differ from the conventional approach to ensuring that survival time requirements are met in TSC do not rely on packet duplication. Instead of packet duplication, the above-described improved techniques use different LCH mapping restrictions based on a LCH mapping restriction controlling rule that determines which LCH mapping restriction applies to which packets in a cycle. The advantage of the improved techniques is the ensuring of survival time requirements while controlling the amount of radio resources to be used.

In some implementations, the LCH mapping restrictions may be related to the serving cells the data can be mapped to. For instance, by default the UE may use resources in both lower frequency range (e.g., FR1 or sub-6 GHz bands) and higher frequency range (e.g., FR2 or mmWave band) to transmit the packets of a traffic flow. However, for packets associating to certain SNs, the UE should only use resources in lower frequency range, to avoid the situations such as N consecutive packets are loss due to beam failure in FR2.

In some implementations, by default the UE may use resources in both licensed bands and unlicensed bands to transmit the packets of a traffic flow. Nevertheless, for packets associating to certain SNs, the UE should only use resources in licensed bands, to avoid the situations such as N consecutive packets are not delivered due to interference or listen-before-talk (LBT) failure in unlicensed bands.

In some implementations, values of the configured parameters (e.g., K and X) and LCH mapping restriction controlling rules, can be dynamically modified with L1/L2 control signalling, such as DCI and MAC CEs, to allow operations with higher flexibility. Nevertheless, the UE may also apply the LCH mapping restriction controlling rule based on the packet type. In some implementations, if the LCH mapping restriction is selected by the PDCP layer, the decision is made based on the QFI associated to the PDCP PDU. In some implementations, the decision is made based on whether the PDCP PDU is a Control PDU or Data PDU.

Figure 8A:
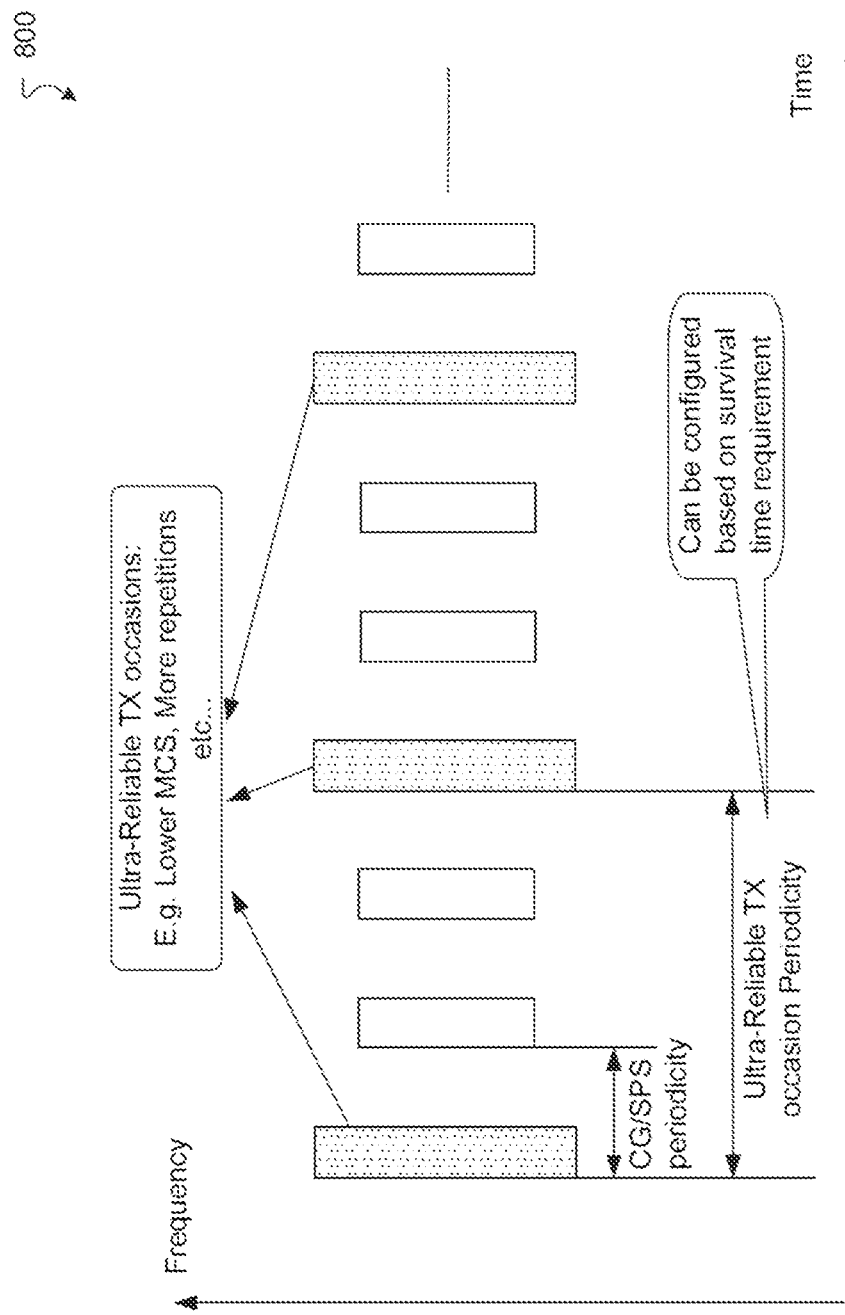
FIG. 8A is a diagram illustrating a scheduling of UL data packets based on a CG/SPS periodicity and an ultra-reliable TX occasion periodicity according to an example implementation.

FIG. 8A is a diagram illustrating an example scheduling 800 of UL data packets based on a CG/SPS periodicity and an ultra-reliable TX occasion periodicity (i.e., a cyclic ultra-reliable TX occasion of CG/SPS). The above-described implementations involve techniques based on packet SN-dependent change of transmission manner Many TSC-type of traffics will be handled by configured scheduling resources such as CG and SPS due to their periodic natures. Another possible approach, shown in FIG. 8A, is to periodically have a CG/SPS occasion that provides ultra-high reliability in a CG/SPS configuration. The high reliability in a CG/SPS configuration periodically is to ensure at least one message can be delivered successfully in the survival time interval. In contrast to the techniques described previously, the change of LCH mapping restriction for uplink is not necessary, because a single CG/SPS contains resources with different reliability targets in this case.

To enable such a method, for at least one CG/SPS configuration, the UE should be configured with the following:
CG/SPS periodicity;
CG/SPS parameters (e.g., MCS/transport block size (TBS), number of repetitions, etc.);
Ultra-Reliable TX occasion periodicity (i.e., how often a more reliable CG/SPS occasion is applied, which can be determined by the gNB based on the knowledge of survival time requirement). This could be a function of the periodicity of the nominal CG/SPS periodicity, e.g., every Nth SPS/CG occasion;
Ultra-Reliable TX occasion parameters (MCS/TBS, number of repetitions, etc., for the more reliable CG/SPS occasions).

Figure 8B:
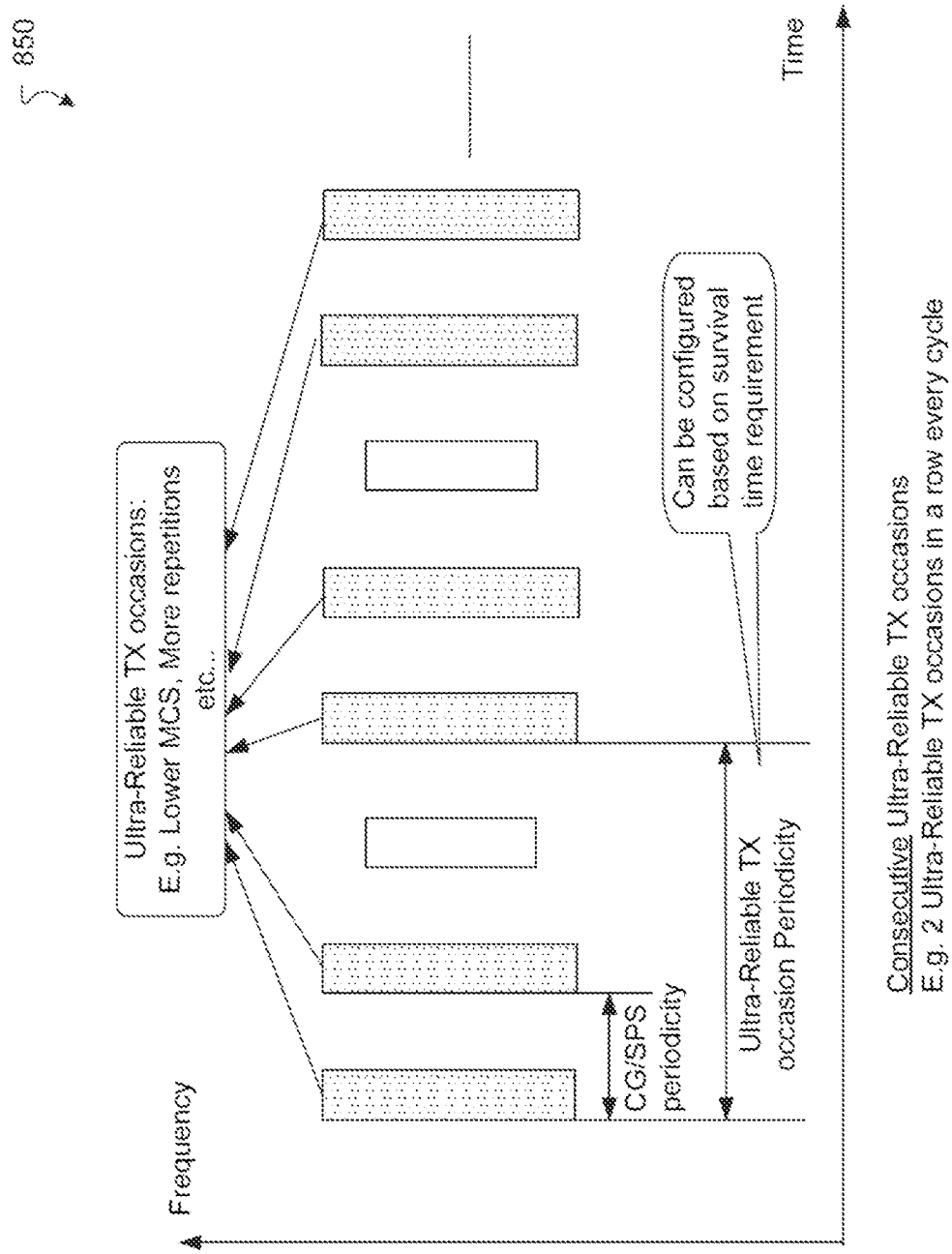
FIG. 8B is a diagram illustrating a scheduling of UL data packets based on a CG/SPS periodicity and an ultra-reliable TX occasion periodicity according to another example implementation

FIG. 8B is a diagram illustrating another example scheduling 850 of UL data packets based on a CG/SPS periodicity and an ultra-reliable TX occasion periodicity (i.e., a cyclic ultra-reliable TX occasion of CG/SPS). This case is analogous to the case in FIG. 3B in which P consecutive packets are sent using a more reliable LCH mapping restriction. The number of consecutive Ultra-Reliable TX occasions in every cycle is determined and configured (along with periodicity and other parameters of Ultra-Reliable TX Occasions) by the gNB. In this way, assuming the application message is segmented into P packets, all of the P packets pertaining to this application message could be transmitted with Ultra-Reliable TX occasions to ensure the whole message is delivered successfully.

Figure 9:
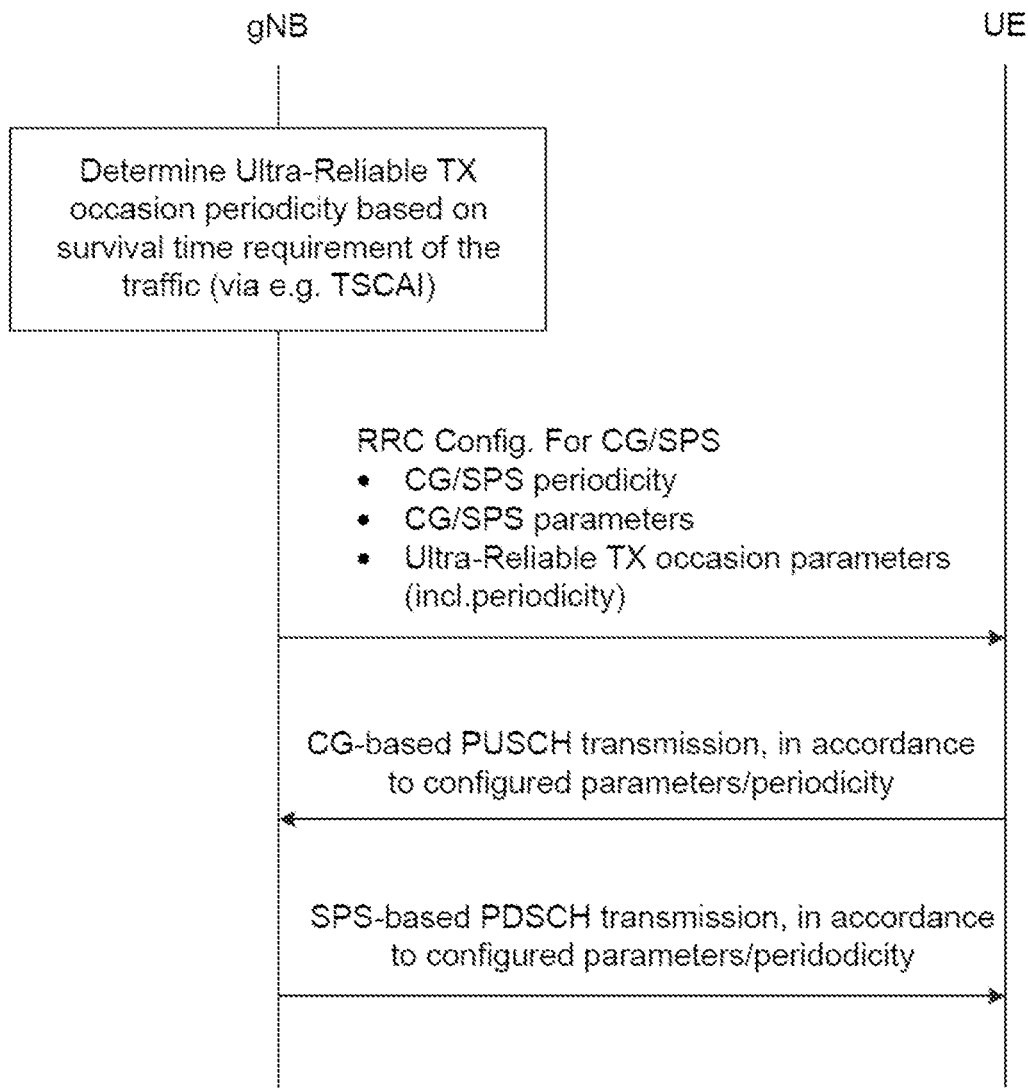
FIG. 9 is a sequence diagram illustrating messaging between a gNB and a UE according to another example implementation.

FIG. 9 is a sequence diagram illustrating messaging between a gNB and a UE according to another example implementation. FIG. 9 shows a message exchange flow chart between gNB and UE for this method, wherein the gNB first determines the periodicity of ultra-reliable TX occasions for CG/SPS based on knowledge relating to survival time of this traffic flow (e.g., based on TSCAI). Then, these parameters (including the periodicities) are given to a UE as a part of CG/SPS configurations.

Figure 10:
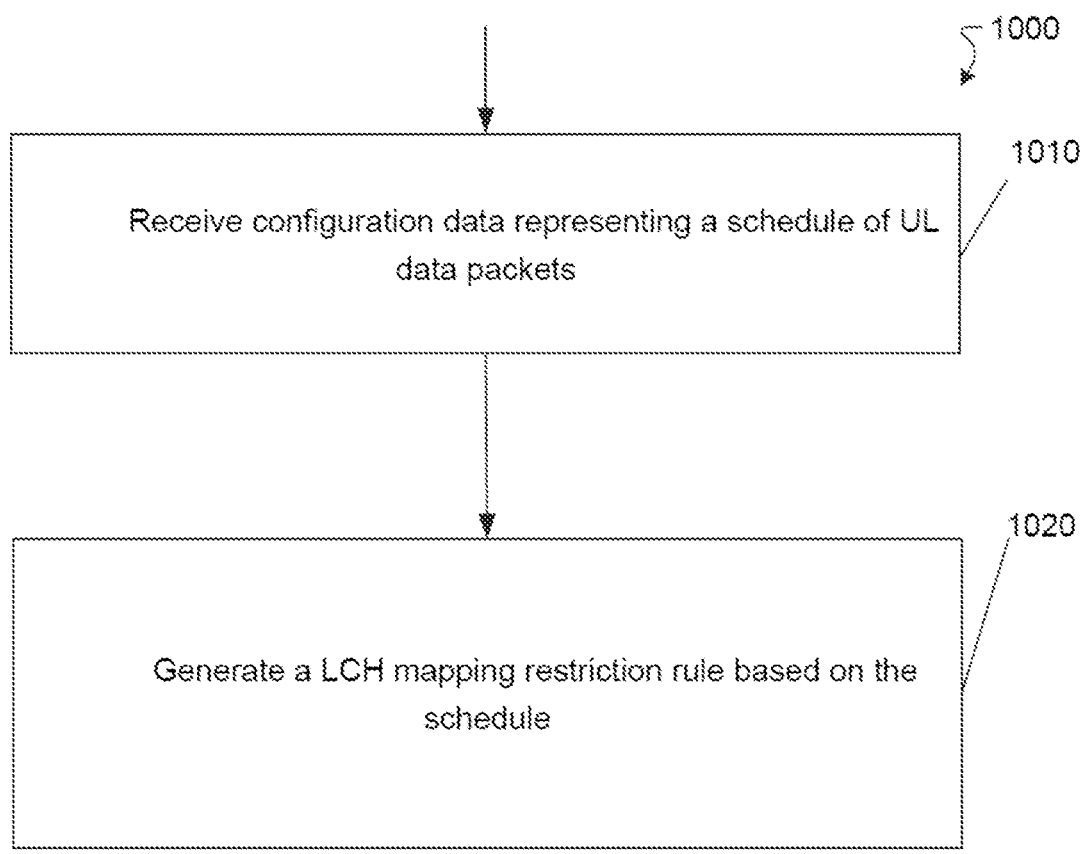
FIG. 10 is a flow chart illustrating a process of generating LCH mapping restriction controlling rules according to an example implementation.

Example 1: FIG. 10 is a flow chart illustrating an example method 1000 of performing the improved techniques. Operation 1010 includes receiving, by a user equipment (UE), configuration message from a node of a network, the configuration message representing criteria relating to characteristics of uplink (UL) data packets. Operation 1020 includes generating, by the UE, a logical channel (LCH) mapping restriction rule based on the criteria relating to characteristics, the LCH mapping restriction controlling rule identifying a first set of UL data packets to be sent to the network using a first logical channel (LCH) and a second set of UL data packets to be sent to the network using a second LCH, the first LCH being associated with a first LCH mapping restriction, the second LCH being associated with a second LCH mapping restriction.

Example 2: According to an example implementation of Example 1, wherein the first LCH corresponds to a first radio link control (RLC) entity and the second LCH corresponds to a second RLC entity, each of the first RLC and the second RLC being configured for a data radio bearer (DRB) and serving a packet data convergence protocol (PDCP) layer.

Example 3: According to an example implementation of Example 2, further comprising performing, in the PDCP layer, a switching operation to switch between the first RLC entity and the second RLC entity based on the identification of the first set of UL data packets and the second set of UL data packets.

Example 4: According to an example implementation of any of Examples 2 or 3, further comprising generating a PDCP protocol data unit (PDU) as one of either the first set of UL data packets or the second set of UL data packets.

Example 5: According to an example implementation of any of Examples 2-4, wherein generating the LCH mapping restriction controlling rule includes for an UL data packet, receiving quality-of-service (QoS) data representing a value of a QoS flow identifiers (QFI) associated with the UL data packet; and determining whether the UL data packet is included in the first set of UL data packets or the second set of UL data packets based on the QFI.

Example 6: According to an example implementation of any of Examples 2-5, wherein generating the LCH mapping restriction controlling rule includes for an UL data packet, receiving an indication as to whether the UL data packet is a control protocol data unit (PDU) or a data PDU determining whether the UL data packet is included in the first set of UL data packets or the second set of UL data packets based on the indication.

Example 7: According to an example implementation of any of Examples 1-6, wherein the configuration message includes values of (i) a parameter K representing a number of UL data packets in a survival time cycle and (ii) a parameter X identifying a UL data packet within the survival time cycle to be sent to the network using the second LCH.

Example 8: According to an example implementation of Example 7, wherein generating the LCH mapping restriction controlling rule includes receiving a sequence number (SN) of an UL data packet; and determining whether the UL data packet is included in the first set of UL data packets or the second set of UL data packets based on based on the SN and the values of the parameter K and the parameter X.

Example 9: According to an example implementation of Example 8, wherein determining whether the UL data packet is included in the first set of UL data packets or the second set of UL data packets includes generating a remainder value as the SN modulo the value of the parameter K; in response to the value of the parameter X being equal to the remainder value, including the UL data packet in the second set of UL data packets; and in response to the value of the parameter X not being equal to the remainder value, including the UL data packet in the first set of UL data packets.

Example 10: According to an example implementation of any of Examples 1-9, wherein the LCH mapping restriction specifies indices of configured grants (CGs).

Example 11: According to an example implementation of any of Examples 1-10, wherein the LCH mapping restriction specifies a type of UL resources.

Example 12: According to an example implementation of claim 11, wherein the LCH mapping restriction specifies type of UL resources from at least one of a dynamic grant (DG), a Type-1 configured grant (CG), and a Type-2 CG.

Example 13: According to an example implementation of any of Examples 1-12, wherein the LCH mapping restriction specifies indices of serving cells.

Example 14: According to an example implementation of any of Examples 1-13, wherein the LCH mapping restriction specifies a duration of a physical uplink shared channel (PUSCH).

Example 15: According to an example implementation of any of Examples 1-14, wherein the LCH mapping restriction specifies subcarrier spacings (SCS).

Example 16: According to an example implementation of any of Examples 1-15, wherein the LCH mapping restriction specifies at least one grant parameter and its values.

Example 17: According to an example implementation of Example 16, wherein the LCH mapping restriction specifies at least one grant parameter includes a modulation and coding scheme (MCS) cell radio network temporary identifier (C-RNTI).

Example 18: According to an example implementation of any of Examples 16 or 17, wherein the LCH mapping restriction specifies at least one grant parameter relating to hybrid automatic repeat request (HARQ) setting.

Example 19: According to an example implementation of any of Examples 1-18, wherein the configuration message is received over a radio resource control (RRC) signal.

Example 20: An apparatus, including at least one processor; and at least one memory including computer program code, the at least one memory and the computer program code configured to, with the at least one processor, cause the apparatus at least to receive configuration message from a node of a network, the configuration message representing criteria relating to characteristics of uplink (UL) data packets; and generate a logical channel (LCH) mapping restriction rule based on the criteria relating to characteristics, the LCH mapping restriction rule identifying a first set of UL data packets to be sent to the network using a first logical channel (LCH) and a second set of UL data packets to be sent to the network using a second LCH, the first LCH being associated with a first LCH mapping restriction, the second LCH being associated with a second LCH mapping restriction.

Example 21: According to an example implementation of Example 20, wherein the first LCH corresponds to a first radio link control (RLC) entity and the second LCH corresponds to a second RLC entity, each of the first RLC and the second RLC being configured for a data radio bearer (DRB) and serving a packet data convergence protocol (PDCP) layer.

Example 22: According to an example implementation of Example 21, wherein the at least one memory and the computer program code is configured to, with the at least one processor, further cause the apparatus at least to perform, in the PDCP layer, a switching operation to switch between the first RLC entity and the second RLC entity based on the identification of the first set of UL data packets and the second set of UL data packets.

Example 23: According to an example implementation of any of Examples 21 or 22, wherein the at least one memory and the computer program code is configured to, with the at least one processor, further cause the apparatus at least to generate a PDCP protocol data unit (PDU) as one of either the first set of UL data packets or the second set of UL data packets.

Example 24: According to an example implementation of any of Examples 21-23, wherein the at least one memory and the computer program code configured to, with the at least one processor, cause the apparatus at least to generate the LCH mapping restriction rule is further configured to cause the apparatus to, for an UL data packet, receive quality-of-service (QoS) data representing a value of a QoS flow identifiers (QFI) associated with the UL data packet; and determining whether the UL data packet is included in the first set of UL data packets or the second set of UL data packets based on the QFI.

Example 25: According to an example implementation of any of Examples 21-24, wherein the at least one memory and the computer program code configured to, with the at least one processor, cause the apparatus at least to generate the LCH mapping restriction controlling rule is further configured to cause the apparatus to, for an UL data packet, receive an indication as to whether the UL data packet is a control protocol data unit (PDU) or a data PDU determining whether the UL data packet is included in the first set of UL data packets or the second set of UL data packets based on the indication.

Example 26: According to an example implementation of any of Examples 1-6, wherein the configuration message includes values of (i) a parameter K representing a number of UL data packets in a survival time cycle and (ii) a parameter X identifying a UL data packet within the survival time cycle to be sent to the network using the second LCH.

Example 27: According to an example implementation of Example 26, wherein the at least one memory and the computer program code configured to, with the at least one processor, cause the apparatus at least to generate the LCH mapping restriction controlling rule is further configured to cause the apparatus to receive a sequence number (SN) of an UL data packet; and determining whether the UL data packet is included in the first set of UL data packets or the second set of UL data packets based on based on the SN and the values of the parameter K and the parameter X.

Example 28: According to an example implementation of Example 27, wherein the at least one memory and the computer program code configured to, with the at least one processor, cause the apparatus at least to determine whether the UL data packet is included in the first set of UL data packets or the second set of UL data packets is further configured to cause the apparatus to generate a remainder value as the SN modulo the value of the parameter K; in response to the value of the parameter X being equal to the remainder value, include the UL data packet in the second set of UL data packets; and in response to the value of the parameter X not being equal to the remainder value, include the UL data packet in the first set of UL data packets.

Example 29: According to an example implementation of any of Examples 20-28, wherein the LCH mapping restriction specifies indices of configured grants (CGs).

Example 30: According to an example implementation of any of Examples 20-29, wherein the LCH mapping restriction specifies a type of UL resources.

Example 31: According to an example implementation of claim 30, wherein the LCH mapping restriction specifies type of UL resources from at least one of a dynamic grant (DG), a Type-1 configured grant (CG), and a Type-2 CG.

Example 32: According to an example implementation of any of Examples 20-31, wherein the LCH mapping restriction specifies indices of serving cells.

Example 33: According to an example implementation of any of Examples 20-32, wherein the LCH mapping restriction specifies a duration of a physical uplink shared channel (PUSCH).

Example 34: According to an example implementation of any of Examples 20-33, wherein the LCH mapping restriction specifies subcarrier spacings (SCS).

Example 35: According to an example implementation of any of Examples 20-34, wherein the LCH mapping restriction specifies at least one grant parameter and its values.

Example 36: According to an example implementation of Example 35, wherein the LCH mapping restriction specifies at least one grant parameter includes a modulation and coding scheme (MCS) cell radio network temporary identifier (C-RNTI).

Example 37: According to an example implementation of any of Examples 35 or 36, wherein the LCH mapping restriction specifies at least one grant parameter relating to hybrid automatic repeat request (HARQ) setting.

Example 38: According to an example implementation of any of Examples 20-37, wherein the configuration message is received over a radio resource control (RRC) signal.

Example 39: An apparatus comprising means for performing a method of any of Examples 1-19.

Example 40: A computer program product including a non-transitory computer-readable storage medium and storing executable code that, when executed by at least one data processing apparatus, is configured to cause the at least one data processing apparatus to perform a method of any of claims 1-19.

Figure 11:
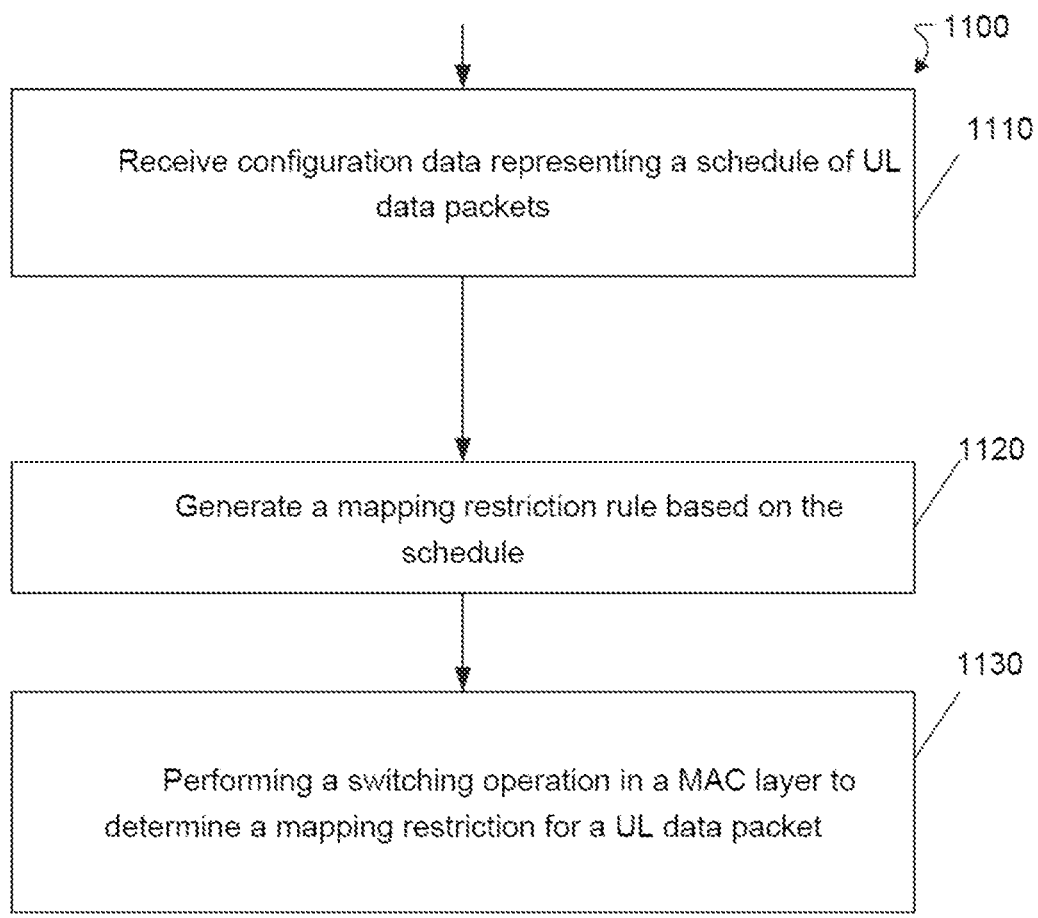
FIG. 11 is a flow chart illustrating a process of performing switching operations in a MAC layer according to an example implementation.

Example 1: FIG. 11 is a flow chart illustrating an example method 1100 of performing the improved techniques. Operation 1110 includes receiving, by a user equipment (UE), configuration message from a node of a network, the configuration message representing criteria relating to characteristics of uplink (UL) data packets. Operation 1120 includes generating, by the UE, a LCH mapping restriction controlling rule based on the criteria relating to characteristics to determine a LCH mapping restriction of a plurality of LCH mapping restrictions used for an UL data packet. Operation 1130 includes performing, by the UE and in a media access control (MAC) layer configured to serve a radio link control, a switching operation to determine a mapping restriction for the UL data packet.

Example 2: An apparatus, including at least one processor; and at least one memory including computer program code, the at least one memory and the computer program code configured to, with the at least one processor, cause the apparatus at least to receive configuration message from a node of a network, the configuration message representing at least one parameter values of a configured grant (CG), wherein the CG comprises a first type of transmissions occasion and a second type of transmission occasions, and the second type of transmission occasions is associated to a different transmission reliability target different to the first type of transmission occasions; and send data to the network over physical uplink shared channel (PUSCH) associating to the CG.

Figure 12:
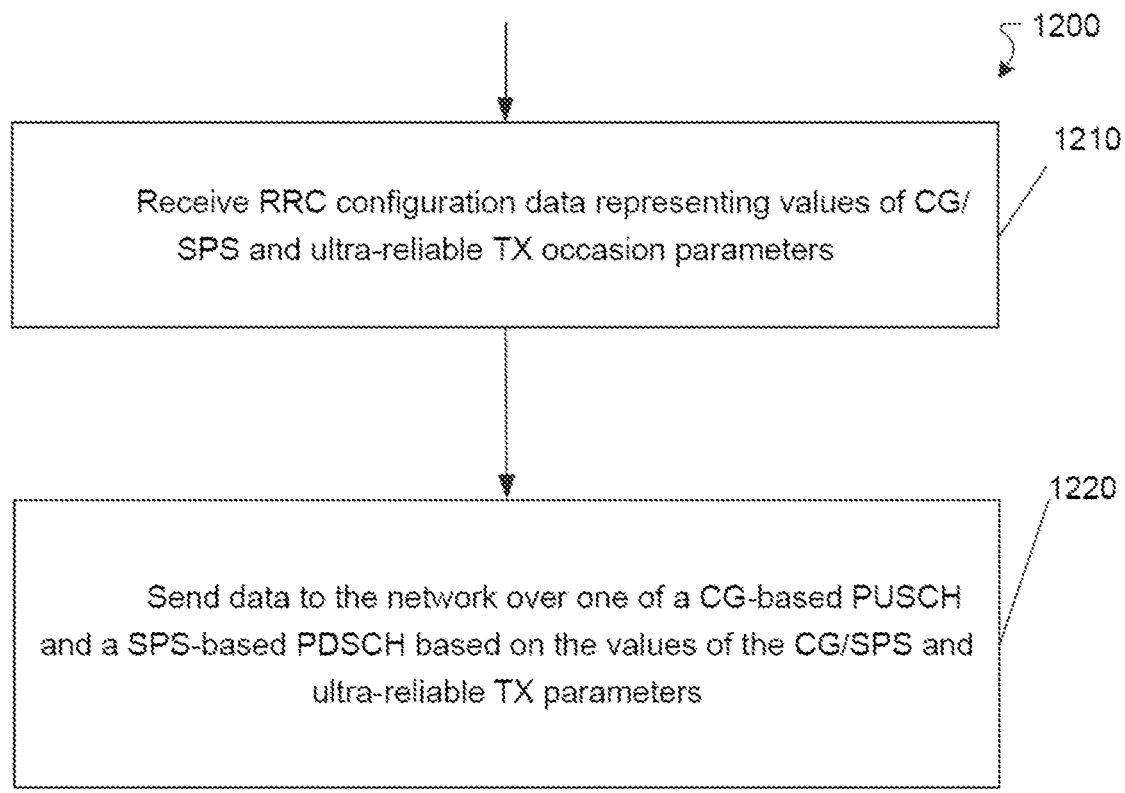
FIG. 12 is a flow chart illustrating a process of sending data over a CG-based PUSCH or SPS-based PDSCH according to an example implementation.

Example 1: FIG. 12 is a flow chart illustrating an example method 1200 of performing the improved techniques. Operation 1210 includes receiving, by a user equipment (UE), radio resource control (RRC) configuration message from a node of a network, the RRC configuration message representing values of a configured grant (CG)/semi-persistent scheduling (SPS) parameters and ultra-reliable transmission (TX) occasion parameters. Operation 1220 includes sending, by the UE, data to the network over a CG-based physical uplink shared channel (PUSCH) based on the values of the CG/SPS and ultra-reliable TX parameters.

Example 2: According to an example implementation of Example 1, further comprising receiving second data over a SPS-based physical downlink shared channel (PDSCH) based on the values of the CG/SPS and ultra-reliable TX parameters.

Example 3: An apparatus, including at least one processor; and at least one memory including computer program code, the at least one memory and the computer program code configured to, with the at least one processor, cause the apparatus at least to receive configuration message from a node of a network, the configuration message representing at least one parameter values of a semi-persistent scheduling (SPS) configuration, wherein the SPS configuration comprises a first type of transmissions occasion and a second type of transmission occasions, and the second type of transmission occasions is associated to a different transmission reliability target different to the first type of transmission occasions; and receive data from the network over physical downlink shared channel (PDSCH) associating to the SPS.

Example 4: According to an example implementation of Example 1, wherein the at least one memory and the computer program code is configured to, with the at least one processor, further cause the apparatus at least to receive second data over a SPS-based physical downlink shared channel (PDSCH) based on the values of the CG/SPS and ultra-reliable TX parameters.

Figure 13:
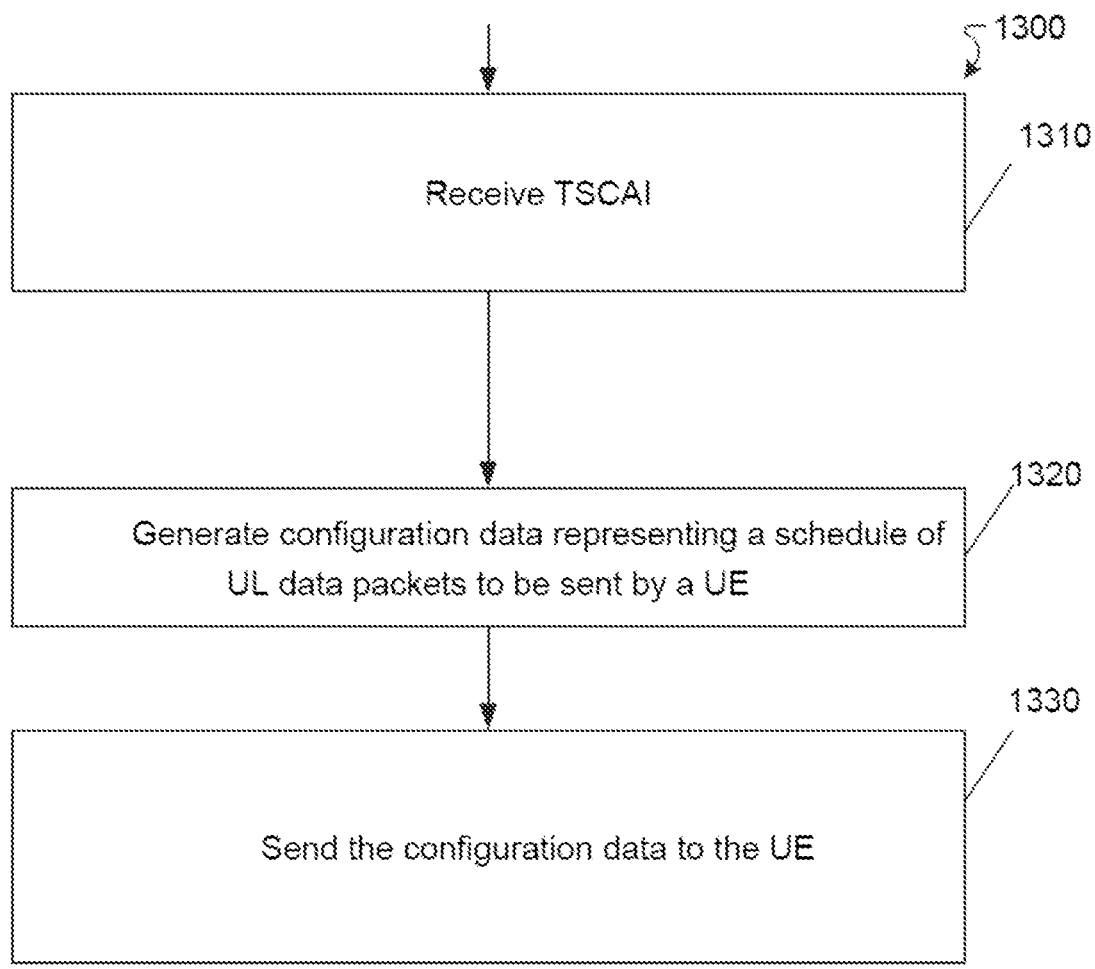
FIG. 13 is a flow chart illustrating a process of generating configuration message for scheduling UL data packets according to an example implementation

Example 1: FIG. 13 is a flow chart illustrating an example method 1300 of performing the improved techniques. Operation 1310 includes receiving, by a node (gNB) of a network, time-sensitive communications (TSC) assistance information (TSCAI) indicating a survival time requirement in the network. Operation 1320 includes generating, by the gNB, configuration message representing criteria relating to characteristics of uplink (UL) data packets to be sent by a user equipment (UE). Operation 1330 includes sending, by the gNB, the configuration message to the UE.

Example 2: According to an example implementation of Example 1, wherein the configuration message is sent to the UE over a radio resource control (RRC) signal.

Example 3: According to an example implementation of any of Examples 1 or 2, wherein the configuration message includes values of (i) a parameter K representing a number of UL data packets in a survival time cycle and (ii) a parameter X identifying a UL data packet within the survival time cycle to be sent to the network using the second LCH.

Example 4: According to an example implementation of any of Examples 1-3, wherein the configuration message includes mapping restriction data representing a first mapping restriction and a second mapping restriction.

Example 5: An apparatus, including at least one processor; and at least one memory including computer program code, the at least one memory and the computer program code configured to, with the at least one processor, cause the apparatus at least to receive time-sensitive communications (TSC) assistance information (TSCAI) indicating a survival time requirement of a traffic flow in the network; generate configuration message representing criteria relating to characteristics of uplink (UL) data packets associating to the traffic flow to be sent by a user equipment (UE); and send the configuration message to the UE.

Example 6: According to an example implementation of Example 5, wherein the configuration message is sent to the UE over a radio resource control (RRC) signal.

Example 7: According to an example implementation of any of Examples 5 or 6, wherein the configuration message includes values of at least one parameter identifying a UL data packet to be sent to the network using the second LCH.

Example 8: According to an example implementation of any of Examples 5-7, wherein the configuration message includes LCH mapping restriction representing a first LCH mapping restriction and a second LCH mapping restriction.

Further example implementations and/or example details will now be provided.

LIST OF EXAMPLE ABBREVIATIONS

Figure 14:
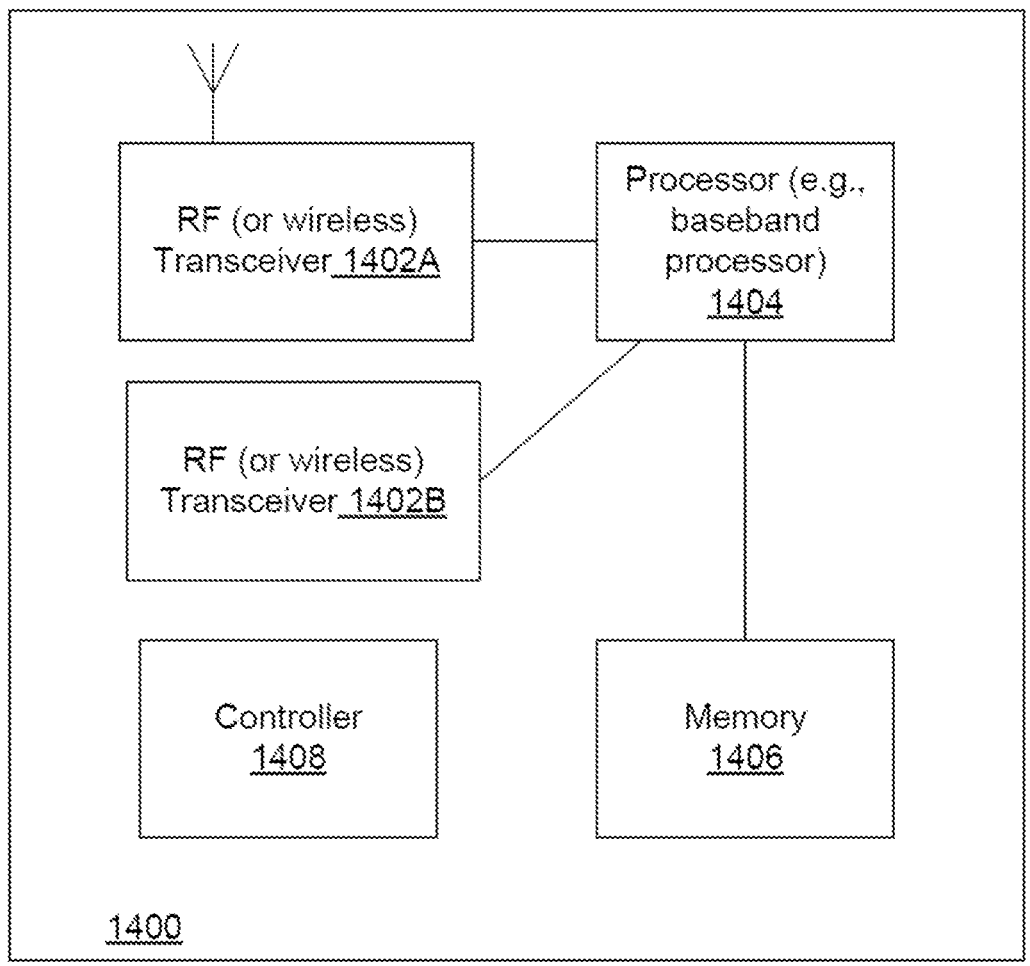
FIG. 14 is a block diagram of a node or wireless station (e.g., base station/access point, relay node, or mobile station/user device) according to an example implementation.

CE Control Element
CG Configured Grant
DCI Downlink Control Information
DG Dynamic Grant
DL Downlink
DRB Data Radio Bearer
FR Frequency Range
gNB next Generation Node B
HARQ Hybrid Automatic Repeat Request
IIOT Industrial Internet of Things
LBT Listen-Before-Talk
LCH Logical Channel
MAC Medium Access Control
MCS Modulation and Coding Scheme
MCS-C-RNTI Modulation Coding Scheme Cell Radio Network Temporary Identifier
mmWave Millimeter Wave
NDI New Data Indicator
NR New Radio
PDCP Packet Data Convergence Protocol
PDSCH Physical Downlink Shared Channel
PDU Protocol Data Unit
PRB Physical Resource Block
PUSCH Physical Uplink Shared Channel
QFI QoS Flow ID
RLC Radio Link Control
RRC Radio Resource Control
SCS Subcarrier Spacing
SDU Service Data Unit
SN Sequence Number
SPS Semi-Persistent Scheduling
TBS Transport Block size
TSC Time-Sensitive Communications
TSCAI TSC Assistance Information
TTI Transmission Time Interval
TX Transmission
UE User Equipment
UL Uplink FIG. 14 is a block diagram of a wireless station (e.g., AP, BS, eNB, UE or user device) 1400 according to an example implementation. The wireless station 1400 may include, for example, one or two RF (radio frequency) or wireless transceivers 1402A, 1402B, where each wireless transceiver includes a transmitter to transmit signals and a receiver to receive signals. The wireless station also includes a processor or control unit/entity (controller) 1404 to execute instructions or software and control transmission and receptions of signals, and a memory 1406 to store data and/or instructions.

Processor 1404 may also make decisions or determinations, generate frames, packets or messages for transmission, decode received frames or messages for further processing, and other tasks or functions described herein. Processor 1404, which may be a baseband processor, for example, may generate messages, packets, frames or other signals for transmission via wireless transceiver 1402 (1402A or 1402B). Processor 1404 may control transmission of signals or messages over a wireless network, and may control the reception of signals or messages, etc., via a wireless network (e.g., after being down-converted by wireless transceiver 1402, for example). Processor 1404 may be programmable and capable of executing software or other instructions stored in memory or on other computer media to perform the various tasks and functions described above, such as one or more of the tasks or methods described above. Processor 1404 may be (or may include), for example, hardware, programmable logic, a programmable processor that executes software or firmware, and/or any combination of these. Using other terminology, processor 1404 and transceiver 1402 together may be considered as a wireless transmitter/receiver system, for example.

In addition, referring to FIG. 14, a controller (or processor) 1408 may execute software and instructions, and may provide overall control for the station 1400, and may provide control for other systems not shown in FIG. 14, such as controlling input/output devices (e.g., display, keypad), and/or may execute software for one or more applications that may be provided on wireless station 1400, such as, for example, an email program, audio/video applications, a word processor, a Voice over IP application, or other application or software.

In addition, a storage medium may be provided that includes stored instructions, which when executed by a controller or processor may result in the processor 1404, or other controller or processor, performing one or more of the functions or tasks described above.

According to another example implementation, RF or wireless transceiver(s) 1402A/1402B may receive signals or data and/or transmit or send signals or data. Processor 1404 (and possibly transceivers 1402A/1402B) may control the RF or wireless transceiver 1402A or 1402B to receive, send, broadcast or transmit signals or data.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium. Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

The invention claimed is:

1. An apparatus, comprising: at least one processor; and at least one memory including computer program code; the at least one memory and the computer program code configured to, with the at least one processor, cause the apparatus at least to:
   receive a configuration message from a node of a network, the configuration message representing criteria relating to characteristics of uplink data packets; and
   generate a logical channel mapping restriction rule based on the criteria relating to characteristics, the logical channel mapping restriction rule identifying a first set of uplink data packets to be sent to the network using a first logical channel and a second set of uplink data packets to be sent to the network using a second logical channel, wherein the configuration message includes a value of at least one parameter identifying at least one uplink data packet to be sent to the network using the second logical channel; and
   wherein the at least one memory and the computer program code configured to, with the at least one processor, cause the apparatus at least to generate the logical channel mapping restriction controlling rule is further configured to cause the apparatus to:
      receive a sequence number of an uplink data packet; and
      determine whether the uplink data packet is included in the first set of uplink data packets or the second set of uplink data packets based on based on the sequence number and the value of the at least one parameter,
   wherein the configuration message includes values of a parameter K representing a number of uplink data packets in a survival time cycle and a parameter X identifying an uplink data packet within the survival time cycle to be sent to the network using the second logical channel,
   wherein generating the logical channel mapping restriction controlling rule includes receiving a sequence number of an uplink data packet and determining whether the uplink data packet is included in the first set of uplink data packets or the second set of UL data packets based on based on the sequence number and the values of the parameter K and the parameter X,
   wherein determining whether the UL data packet is included in the first set of uplink data packets or the second set of UL data packets includes generating a remainder value as a sequence number modulo the value of the parameter K and in response to the value of the parameter X being equal to the remainder value, including the uplink data packet in the second set of UL data packets and in response to the value of the parameter X not being equal to the remainder value, including the uplink data packet in the first set of uplink data packets.

2. The apparatus of claim 1, wherein the first logical channel being associated with a first logical channel mapping restriction and the second logical channel being associated with a second logical channel mapping restriction.

3. The apparatus of claim 1 wherein the first logical channel corresponds to a first radio link control entity and the second logical channel corresponds to a second radio link control entity, each of the first radio link control entity and the second radio link control entity being configured for a data radio bearer and serving a packet data convergence protocol layer.

4. The apparatus of claim 3, wherein the at least one memory and the computer program code is configured to, with the at least one processor, further cause the apparatus at least to:
   perform, in the packet data convergence protocol layer, a switching operation to switch between the first radio link control entity and the second radio link control entity based on the identification of the first set of uplink data packets and the second set of uplink data packets.

5. The apparatus of claim 3, wherein the at least one memory and the computer program code is configured to, with the at least one processor, further cause the apparatus at least to:
   generate a packet data convergence protocol data unit as one of either the first set of uplink data packets or the second set of uplink data packets.

6. The apparatus of claim 1, wherein the at least one memory and the computer program code configured to, with the at least one processor, cause the apparatus at least to generate the logical channel mapping restriction rule is further configured to cause the apparatus to:
   for an uplink data packet, receive a QoS flow identifier associated with the uplink data packet; and
   determine whether the uplink data packet is included in the first set of uplink data packets or the second set of uplink data packets based on the QoS flow identifier.

7. The apparatus of claim 1, wherein the at least one memory and the computer program code configured to, with the at least one processor, cause the apparatus at least to generate the logical channel mapping restriction controlling rule is further configured to cause the apparatus to:
   for an uplink data packet, receive an indication as to whether the uplink data packet is a control protocol data unit or a data protocol data unit; and
   determine whether the uplink data packet is included in the first set of uplink data packets or the second set of uplink data packets based on the indication.

8. The apparatus of claim 1, wherein the logical channel mapping restriction specifies indices of configured grants.

9. The apparatus of claim 1, wherein the logical channel mapping restriction specifies a type of uplink resources.

10. The apparatus of claim 1, wherein the logical channel mapping restriction specifies types of uplink resources from a dynamic grant, a Type-1 configured grant, and a Type-2 configured grant.

11. The apparatus of claim 1, wherein the logical channel mapping restriction specifies indices of serving cells.

12. The apparatus of claim 1, wherein the logical channel mapping restriction specifies a duration of a physical uplink shared channel.

13. The apparatus as in claim 1, wherein the logical channel mapping restriction specifies subcarrier spacings.

14. The apparatus of claim 1, wherein the logical channel mapping restriction specifies at least one grant parameter and its value.

15. The apparatus of claim 14, wherein the at least one grant parameter includes a modulation and coding scheme cell radio network temporary identifier.

16. The apparatus of claim 14, wherein the logical channel mapping restriction specifies at least one grant parameter relating to a hybrid automatic repeat request setting.

17. The apparatus of claim 1, wherein the configuration message is received over a radio resource control signal.

18. A computer program product including a non-transitory computer-readable storage medium storing executable code that, when executed by at least one data processing apparatus, is configured to cause the at least one data processing apparatus to:
receive a configuration message from a node of a network, the configuration message representing criteria relating to characteristics of uplink data packets; and
generate a logical channel mapping restriction rule based on the criteria relating to characteristics, the logical channel mapping restriction rule identifying a first set of uplink data packets to be sent to the network using a first logical channel and a second set of uplink data packets to be sent to the network using a second logical channel, wherein the configuration message includes a value of at least one parameter identifying at least one uplink data packet to be sent to the network using the second logical channel; and
wherein the at least one data processing apparatus that is caused to generate the logical channel mapping restriction controlling rule is further caused to:
receive a sequence number of an uplink data packet; and
determine whether the uplink data packet is included in the first set of uplink data packets or the second set of uplink data packets based on based on the sequence number and the value of the at least one parameter,
wherein the configuration message includes values of a parameter K representing a number of uplink data packets in a survival time cycle and a parameter X identifying an uplink data packet within the survival time cycle to be sent to the network using the second logical channel,
wherein generating the logical channel mapping restriction controlling rule includes receiving a sequence number of an uplink data packet and determining whether the uplink data packet is included in the first set of uplink data packets or the second set of UL data packets based on based on the sequence number and the values of the parameter K and the parameter X,
wherein determining whether the UL data packet is included in the first set of uplink data packets or the second set of UL data packets includes generating a remainder value as a sequence number modulo the value of the parameter K and in response to the value of the parameter X being equal to the remainder value, including the uplink data packet in the second set of UL data packets and in response to the value of the parameter X not being equal to the remainder value, including the uplink data packet in the first set of uplink data packets.

* * * * *